United States Patent
Tsuzaki et al.

(10) Patent No.: US 9,218,684 B2
(45) Date of Patent: Dec. 22, 2015

(54) DISPLAY CONTROL APPARATUS AND METHOD, AND DISPLAY APPARATUS

(71) Applicant: Japan Display Inc., Tokyo (JP)

(72) Inventors: Ryoichi Tsuzaki, Kanagawa (JP); Tsuyoshi Ohyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 394 days.

(21) Appl. No.: 13/677,784

(22) Filed: Nov. 15, 2012

(65) Prior Publication Data
US 2013/0127840 A1     May 23, 2013

(30) Foreign Application Priority Data
Nov. 22, 2011   (JP) .................................. 2011-255534

(51) Int. Cl.
G06T 15/00     (2011.01)
H04N 13/00     (2006.01)
H04N 13/04     (2006.01)

(52) U.S. Cl.
CPC ............ *G06T 15/00* (2013.01); *H04N 13/0011* (2013.01); *H04N 13/0422* (2013.01); *H04N 13/0447* (2013.01)

(58) Field of Classification Search
CPC combination set(s) only.
See application file for complete search history.

(56) References Cited

U.S. PATENT DOCUMENTS

2010/0033556 A1* 2/2010 Saishu et al. ................... 348/51
2014/0152690 A1* 6/2014 Yuda et al. .................... 345/612

FOREIGN PATENT DOCUMENTS

| JP | 09-049986 | 2/1997 |
| JP | 2005-110010 | 4/2005 |
| JP | 2010-109414 | 5/2010 |

OTHER PUBLICATIONS

Japanese Office Action mailed Jun. 24, 2014 for corresponding Japanese Application No. 2011-255534.

* cited by examiner

*Primary Examiner* — Leon T Cain, II
(74) *Attorney, Agent, or Firm* — Michael Best & Friedrich LLP

(57) ABSTRACT

A display control apparatus includes a conversion and synthesis unit that converts an array of pixels constituting each of planar images for multiple view points and synthesize the planar images in which the array of the pixels is converted to generate a three-dimensional display image, the unit including a correspondence control unit that associates view point image sub pixels with three-dimensional display sub pixels, a sub pixel value decision unit that decides a value of the sub pixel before the conversion for each color of the sub pixels on the basis of the view point image sub pixel extracted from the planar image for each view point, and a sub pixel generation unit that obtains a value of the sub pixel after the conversion on the basis of the decided value of the sub pixel before the conversion to generate the associated three-dimensional display sub pixels.

10 Claims, 24 Drawing Sheets

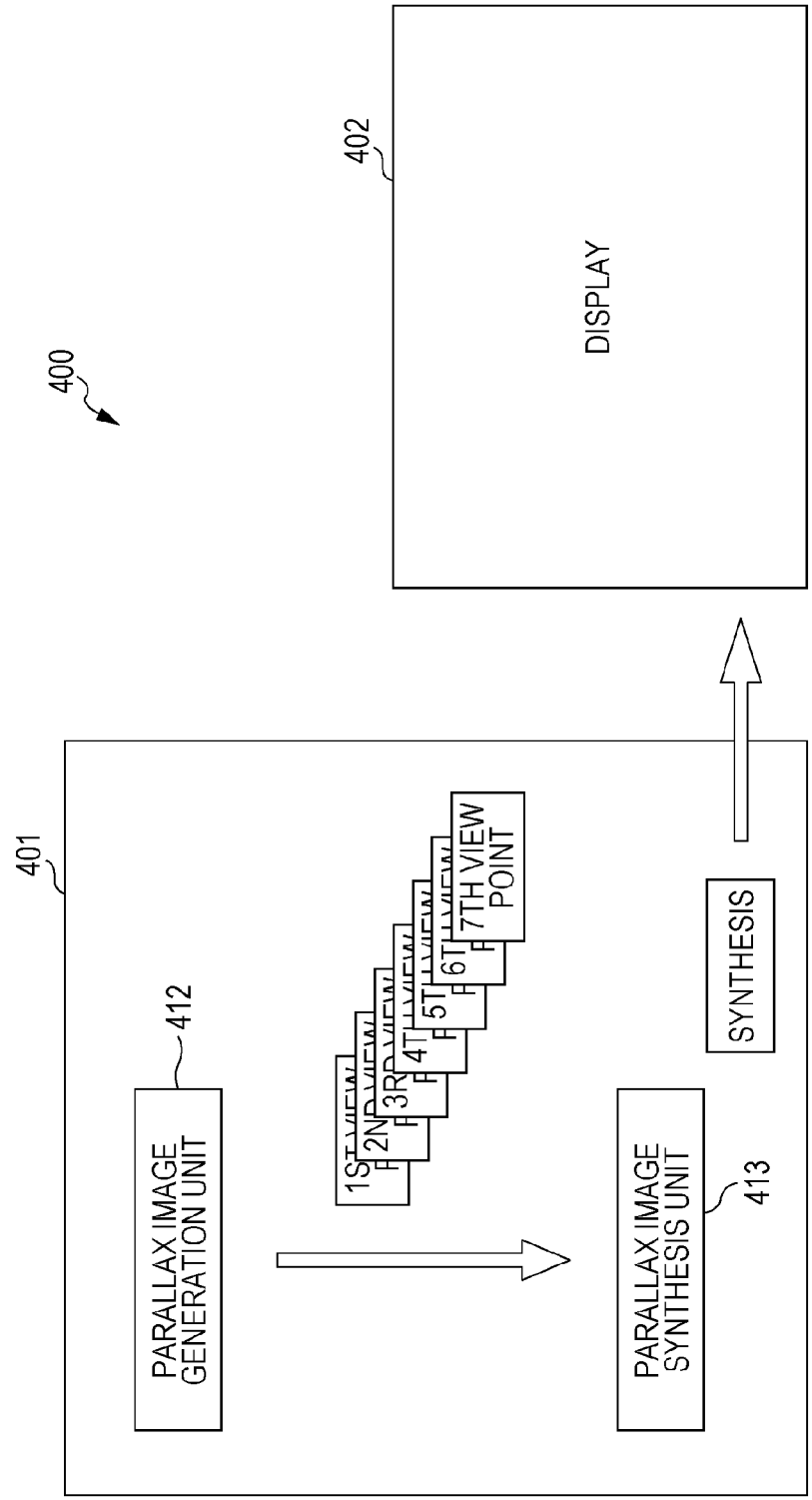

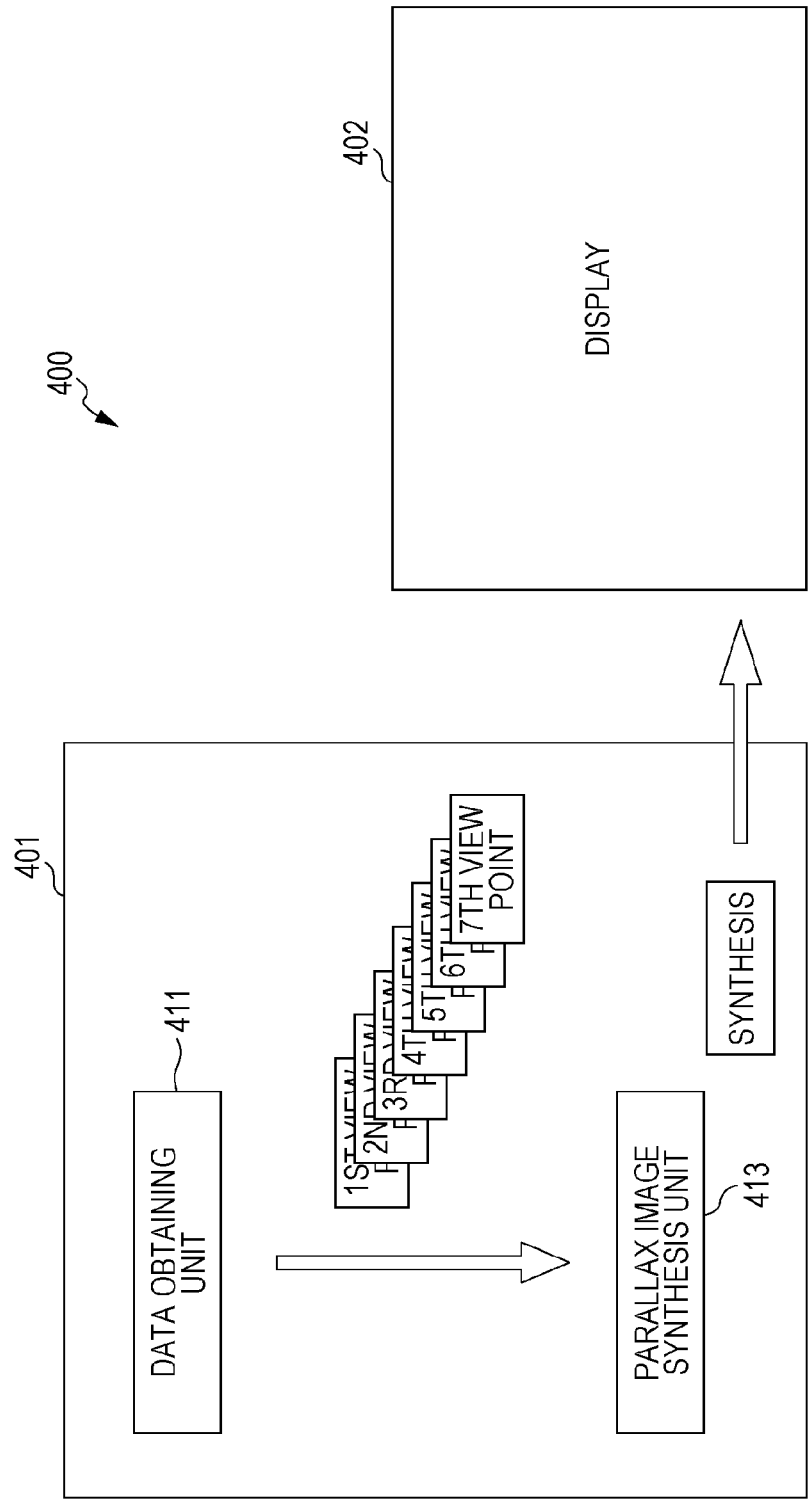

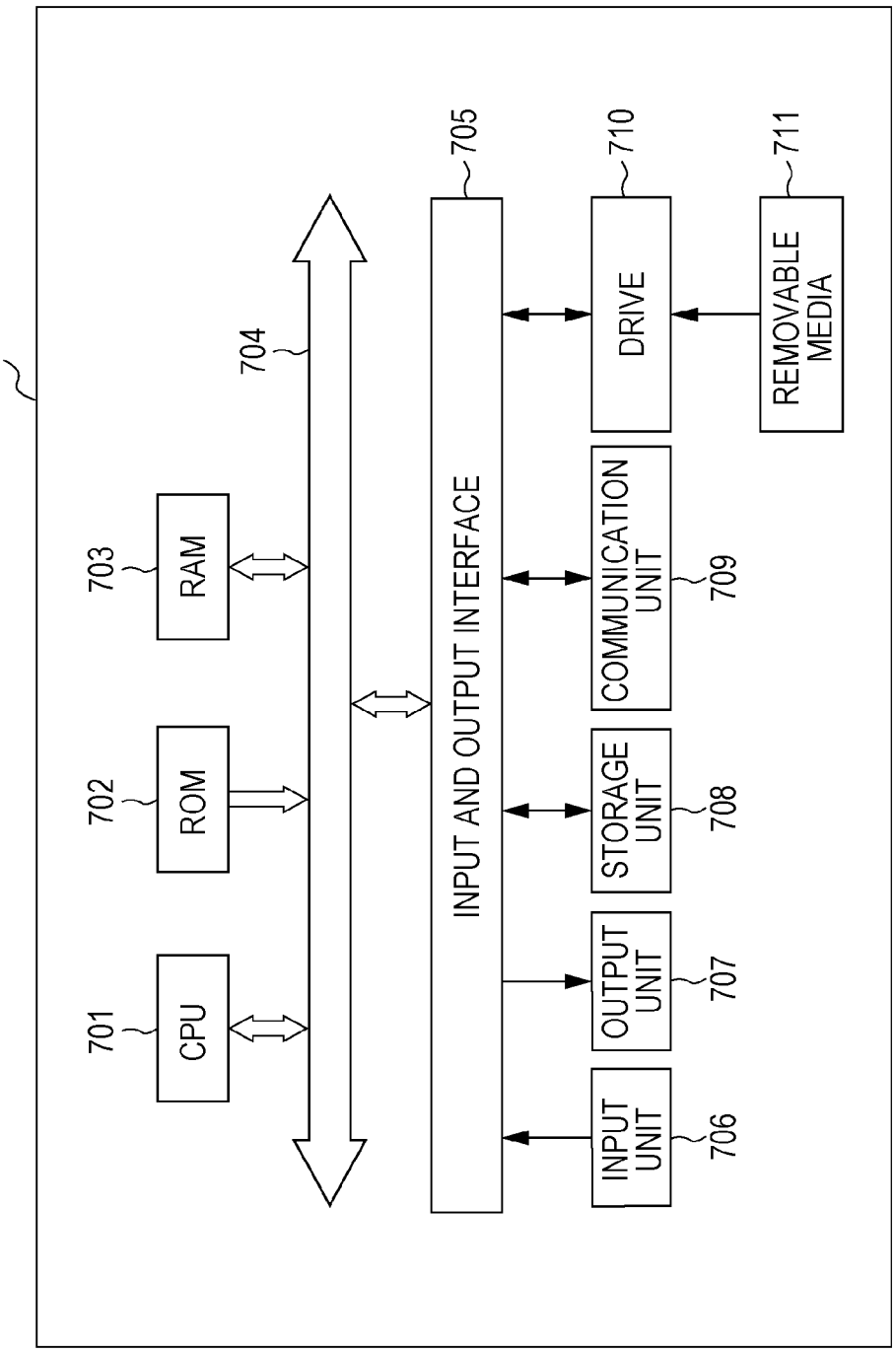

DISPLAY CONTROL APPARATUS AND METHOD, AND DISPLAY APPARATUS

BACKGROUND

The present technology relates to a display control apparatus and method, and a display apparatus, in particular, a display control apparatus and method, and a display apparatus with which when an array of pixels in an image having a parallax is converted, the conversion can be conducted while a degradation in an image quality is suppressed.

In recent years, to realize a three-dimensional display of an image, many types of systems for generating image data on an image having a parallax have been developed.

For example, a technology is proposed in which in an odd-numbered pixel row, pieces of odd-numbered color pixel data are synthesized in the order of "right", "left", and "right", and pieces of even-numbered color pixel data are synthesized in the order of "left", "right", and "left" (for example, see Japanese Unexamined Patent Application Publication No. 2010-109414). With the above-mentioned setting, since varieties of color pixel data are alternately arranged in an extending direction of the pixel row, it is possible to synthesize parallax image data with which a smooth three-dimensional image having no sense of discomfort can be displayed.

Furthermore, a display of a natural three-dimensional irrespective of an observing position is also conducted by generating an image from multiple view points (for example, see Japanese Unexamined Patent Application Publication No. 2005-110010).

For example, as a method of realizing a multi-view point video display without a use of special glasses, a parallax barrier system and the like are proposed. According to these systems, images of the multiple view points are, for example, alternately displayed on a screen in a straight line manner in a longitudinal direction (straight barrier system), and this displayed video is separated by a slit, a lenticular lens, or the like. Then, since the separated images are guided to observers located at each of the view points, the multi-view point display is carried out.

In a general liquid crystal display or the like in related art, pixels in a stripe array are used in many cases. With regard to the pixels in the stripe array, for example, respective sub pixels of R, G, and B are set to be vertically-long rectangular, and a single pixel is constructed by arranging those three sub pixels in the longitudinal direction.

On the other hand, in recent years, pixels in a square array are used in some cases. With regard to the pixels in the square array, for example, respective sub pixels of R, G, B, and W are set to be square, and a single pixel is constructed by arranging those four sub pixels in two rows and two columns (four-quadrant shape).

For example, a technology for converting the pixels in the stripe array into the pixels in the square array is also proposed.

SUMMARY

Incidentally, for example, in a case where an image having a parallax is generated by using the pixels in the square array, to suppress a generation of a color mixture between the sub pixels, a resolution in a lateral direction is set to be two-folds.

In the above-mentioned case, when the pixels in the stripe array are converted into the pixels in the square array, a shift of the arrangements between the pixels in the stripe array and the pixels in the square array is generated. For this reason, a conversion sufficiently taking into account a correspondence between the pixels before the conversion and the pixels after the conversion is to be carried out.

The present technology has been disclosed in view of the above-mentioned circumstances, when an array of pixels in an image having a parallax is converted, it is desirable to conduct the conversion while a degradation in an image quality is suppressed.

According to an embodiment of the present technology, there is provided a display control apparatus including a conversion and synthesis unit configured to convert an array of pixels constituting each of planar images for multiple view points and synthesize the planar images for the multiple view points with each other in which the array of the pixels is converted to generate a three-dimensional display image, the conversion and synthesis unit including a correspondence control unit configured to associate view point image sub pixels corresponding to sub pixels of the pixel constituting each of the planar images for the multiple view points with three-dimensional display sub pixels corresponding to sub pixels of the pixels constituting the three-dimensional display image, a sub pixel value decision unit configured to decide a value of the sub pixel before the conversion for each color of the sub pixels on the basis of the view point image sub pixel extracted from the planar image for each view point, and a sub pixel generation unit configured to obtain a value of the sub pixel after the conversion on the basis of the decided value of the sub pixel before the conversion to generate the three-dimensional display sub pixels associated with the view point image sub pixels.

The conversion and synthesis unit can convert pixels in a stripe array composed of sub pixels of three colors into pixels in a square array composed of sub pixels of four colors.

A resolution in a horizontal direction can be set to be doubled and a resolution in a vertical direction can be set to be halved in the three-dimensional display image with respect to the planar image.

The sub pixel value decision unit can decide, in a case where two or more sub pixels are included per color in the view point image sub pixels associated by the correspondence control unit, a value obtained by applying a predetermined computation on values of the two or more sub pixels as the value of the sub pixel before the conversion related to the relevant color.

The sub pixel value decision unit can decide, in a case where two sub pixels are included per color in the view point image sub pixels associated by the correspondence control unit, a higher value among the two sub pixel values as the value of the sub pixel before the conversion related to the relevant color.

The sub pixel value decision unit can decide, in a case where two sub pixels are included per color in the view point image sub pixels associated by the correspondence control unit, a lower value among the two sub pixel values as the value of the sub pixel before the conversion related to the relevant color.

A three-dimensional image can be observed by observing the three-dimensional display image synthesized by the conversion and synthesis unit through a parallax barrier having a predetermined shape.

According to a further embodiment of the present technology, there is provided a display control method including generating a three-dimensional display image by a conversion and synthesis unit by converting an array of pixels constituting each of planar images for multiple view points and synthesizing the planar images for the multiple view points in which the array of the pixels is converted with each other, the generating the three-dimensional display image including associating view point image sub pixels corresponding to sub pixels of the pixel constituting each of the planar images for the multiple view points with three-dimensional display sub pixels corresponding to sub pixels of the pixels constituting the three-dimensional display image, deciding a value of the sub pixel before the conversion for each color of the sub pixels on the basis of the view point image sub pixel extracted from the planar image for each view point, and generating the three-dimensional display sub pixels associated with the view point image sub pixels by obtaining a value of the sub pixel after the conversion on the basis of the decided value of the sub pixel before the conversion.

According to the embodiment of the present technology, the array of the pixels constituting each of the planar images for the multiple view points is converted and the planar images for the multiple view points in which the array of the pixels is converted are synthesized with each other to generate the three-dimensional display image, the view point image sub pixels corresponding to the sub pixels of the pixel constituting each of the planar images for the multiple view points are associated with the three-dimensional display sub pixels corresponding to the sub pixels of the pixels constituting the three-dimensional display image, the value of the sub pixel before the conversion for each color of the sub pixels is decided on the basis of the view point image sub pixel extracted from the planar image for each view point, and the value of the sub pixel after the conversion is obtained on the basis of the decided value of the sub pixel before the conversion to generate the three-dimensional display sub pixels associated with the view point image sub pixels.

According to another embodiment of the present technology, there is provided a display apparatus including a display control unit that includes a conversion and synthesis unit configured to convert an array of pixels constituting each of planar images for multiple view points and synthesize the planar images for the multiple view points with each other in which the array of the pixels is converted to generate a three-dimensional display image, a display unit configured to display the three-dimensional display image generated by the display control unit, and a separation unit configured to optically separate the images for the respective view points from each other in the displayed three-dimensional display image to cause the images of different view points to be observed by different eyes of an observer, the conversion and synthesis unit including a correspondence control unit configured to associate view point image sub pixels corresponding to sub pixels of the pixel constituting each of the planar images for the multiple view points with three-dimensional display sub pixels corresponding to sub pixels of the pixels constituting the three-dimensional display image, a sub pixel value decision unit configured to decide a value of the sub pixel before the conversion for each color of the sub pixels on the basis of the view point image sub pixel extracted from the planar image for each view point, a sub pixel generation unit configured to obtain a value of the sub pixel after the conversion on the basis of the decided value of the sub pixel before the conversion to generate the three-dimensional display sub pixels associated with the view point image sub pixels.

A liquid crystal lens can be used for an optical separation element constituting the separation unit.

According to the embodiment of the present technology, the array of the pixels constituting each of the planar images for the multiple view points is converted and the planar images for the multiple view points in which the array of the pixels is converted are synthesized with each other to generate the three-dimensional display image, the view point image sub pixels corresponding to the sub pixels of the pixel constituting each of the planar images for the multiple view points are associated with the three-dimensional display sub pixels corresponding to the sub pixels of the pixels constituting the three-dimensional display image, the value of the sub pixel before the conversion for each color of the sub pixels is decided on the basis of the view point image sub pixel extracted from the planar image for each view point, and the value of the sub pixel after the conversion is obtained on the basis of the decided value of the sub pixel before the conversion to generate the three-dimensional display sub pixels associated with the view point image sub pixels. Also, the generated three-dimensional display image is displayed, and the images of the respective view points are optically separated from each other in the displayed three-dimensional display image to cause the images of different view points to be observed by different eyes of an observer.

According to the embodiments of the present technology, when the array of the pixels in the image having the parallax is converted, it is possible to conduct the conversion while the degradation in the image quality is suppressed.

BRIEF DESCRIPTION OF THE DRAWINGS

FIG. 33 is a block diagram of another configuration example of the multi-view point three-dimensional display system according to the embodiment to which the present technology is applied;

FIG. 34 is a block diagram of still another configuration example of the multi-view point three-dimensional display system according to the embodiment to which the present technology is applied; and FIG. 35 is a block diagram of a configuration example of a personal computer.

DETAILED DESCRIPTION OF EMBODIMENTS

Hereinafter, with reference to the drawings, embodiments of the technology disclosed herein will be described.

First, a three-dimensional display using a multi-view point image will be described.

Figure 1:
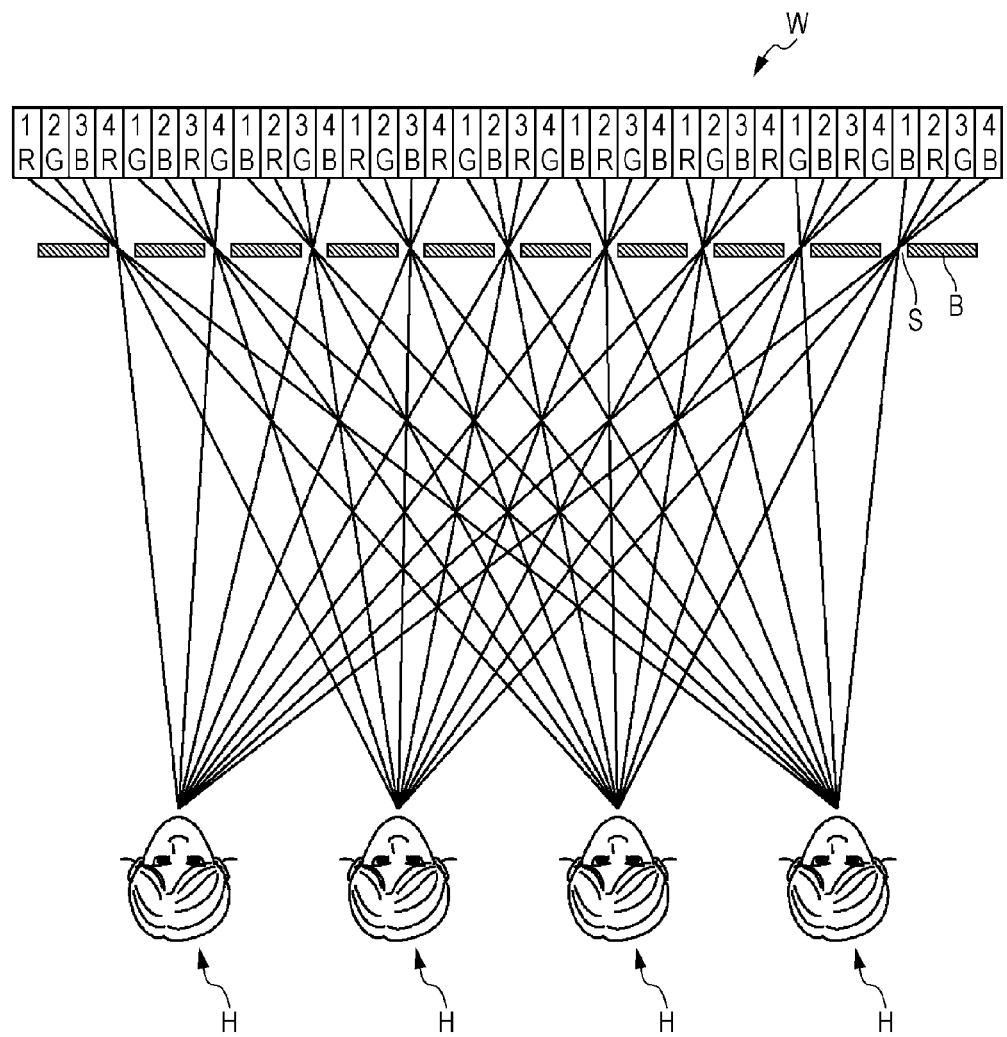
FIG. 1 is an explanatory diagram for describing an example of a three-dimensional display using an image having four view points.

FIG. 1 is an explanatory diagram for describing an example of a three-dimensional display using an image having four view points. In this display apparatus, sub pixels configured to display a first view point image, a second view point image, a third view point image, and a fourth view point image are alternately arranged in the horizontal direction of a screen W. The four sub pixels configured to display the first view point image to the fourth view point image constitute a display pixel corresponding to a minimum display unit of a synthesis image obtained by synthesizing the four images. The above-mentioned display pixels are arranged in a matrix manner on the screen W, the synthesis image as a whole is formed by these plural display pixels.

It should be noted that the pixels constituting the image mean, in principle, for example, a combination of the red sub pixel, the green sub pixel, and the blue sub pixel, but the pixel is easily confused with the sub pixel when a description will be given of the technology taking the sub pixel into account. In the present specification, to clarify the distinction between the sub pixel and the pixel, a combination of plural sub pixels will appropriately be referred to as display pixel.

A parallax barrier B that spatially respectively separates the first view point image to the fourth view point image is arranged between the screen W and observers H. The parallax barrier B is provided with plural slits S corresponding, for example, to the respective display pixels, and separates the first view point image to the fourth view point image displayed in the respective display pixels to be displayed to the observers H.

Figure 2A:
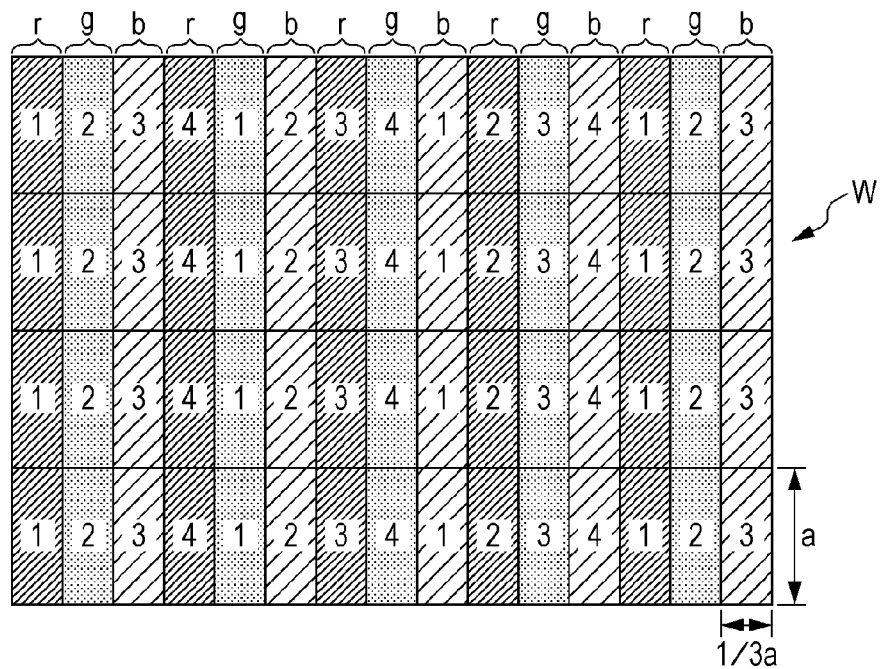
FIGS. 2A and 2B are plan views of a synthesis image synthesized by a display apparatus of FIG. 1.
Figure 2B:
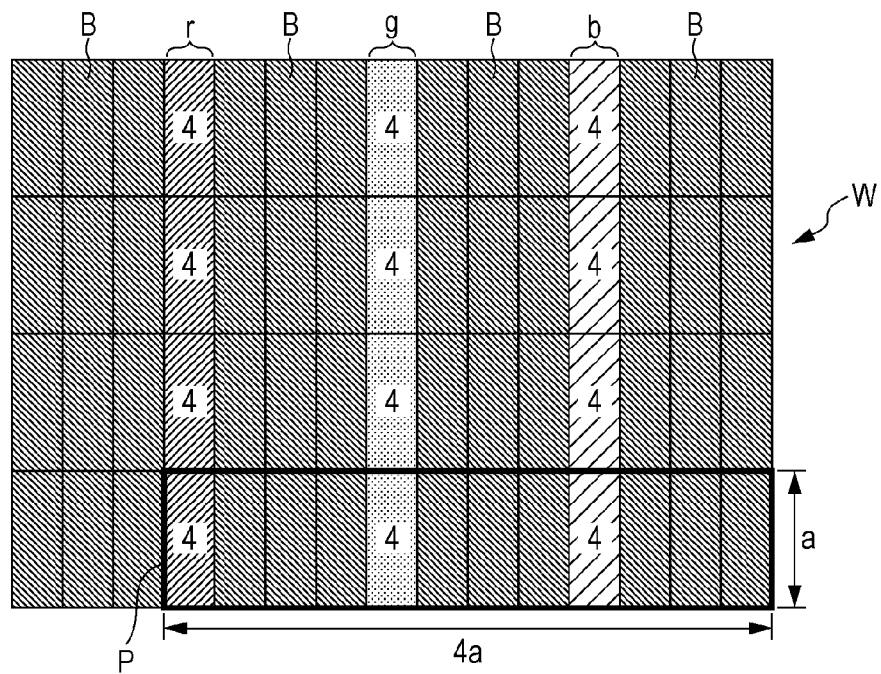

FIGS. 2A and 2B are plan views illustrating a part of a synthesis image displayed on the screen W. FIG. 2A is a plan view of the synthesis image, and FIG. 2B is a plan view of the fourth view point image as observed via the parallax barrier B.

As illustrated in FIG. 2A, four images are respectively displayed alternately every column (every sub pixel). In FIG. 2A, plural sub pixel denoted by a common numeral n are sub pixels configured to display an image of a same view point (n-th view point). The four images illustrated in FIG. 1 represent images formed by sub pixels of one column respectively arranged in the vertical direction. Since plural sub pixels are arranged in the horizontal direction, the image as a whole is displayed.

In FIGS. 2A and 2B, "r", "g", and "b" are respectively sub pixels of red, green, and blue. The first view point image to the fourth view point image are respectively constructed by the plural display pixels including the three sub pixels of red, green, and blue. For example, as illustrated in FIG. 2B, the fourth view point image is constructed by a display pixel P including the three sub pixels of red, green, and blue which are arranged every four sub pixels. Then, the fourth view point image as a whole is formed by the plural display pixels P arranged in the matrix manner.

According to the system illustrated in FIGS. 2A and 2B, the sub pixels constructing the respective images displayed in a straight line manner in the longitudinal direction to be displayed, and the system is referred to as straight barrier system. However, in the case of the straight barrier system, with regard to the display pixel P, since the three sub pixels are arranged every three sub pixels, the entire display pixel is expanded four-fold (to a size corresponding to four pixels) in the horizontal direction as compared with a case of displaying a normal two-dimensional image, and a sufficient reproducibility is not obtained in a case where a fine shape is displayed.

For example, a step barrier system is also used in which the four images are alternately arranged in both the horizontal direction and the vertical direction and the parallax barrier B is accordingly arranged diagonally with respect to the horizontal direction.

Figure 3A:
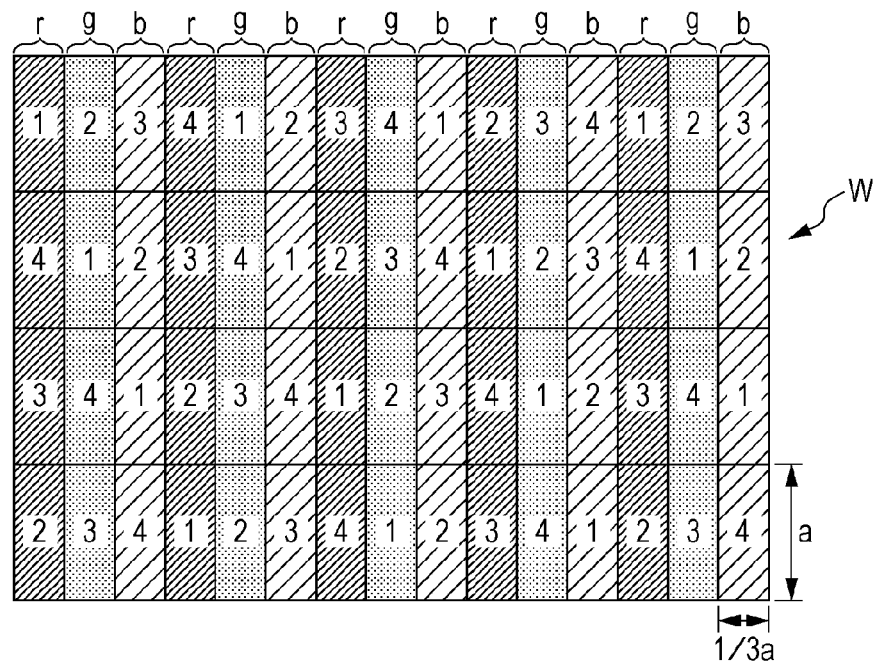
FIGS. 3A and 3B are plan views of another example of the image generated by the display apparatus of FIG. 1.
Figure 3B:
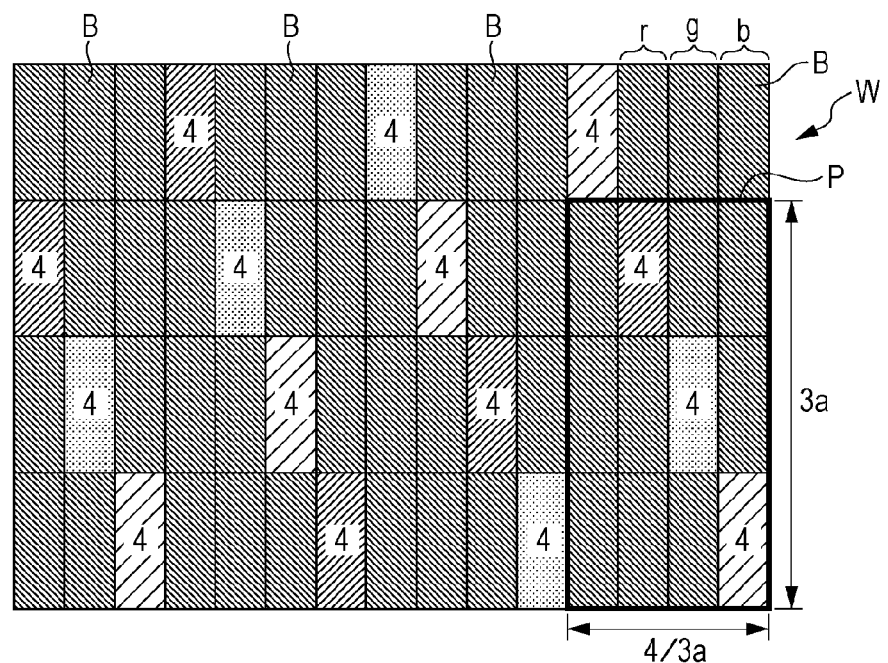

FIGS. 3A and 3B are plan views illustrating a part of a synthesis image obtained by using the step barrier system.

FIG. 3A is a plan view of the synthesis image, and FIG. 3B is a plan view of the fourth view point image as observed via the parallax barrier B.

As illustrated in FIGS. 3A and 3B, the four images are respectively alternately displayed in the horizontal direction and the vertical direction every sub pixel, and in a case where the four images are observed via the parallax barrier B, the three sub pixels of red, green, and blue are arranged in a step manner in a diagonal direction with respect to the horizontal direction. Also, slits of the parallax barrier B are arranged in the step manner in an diagonal direction corresponding to the array of the sub pixels of red, green, and blue which are arranged in the diagonal direction, and other view point images are not displayed on the fourth view point image as observed via the parallax barrier B.

Herein, the example has been described in which the slits are used as the parallax barrier, but for example, a lenticular lens, a liquid crystal lens, and the like may also be used.

In the above-mentioned manner, the three-dimensional display using the multi-view point image is carried out.

Incidentally, in a general liquid crystal display or the like in related art, the pixels in the stripe array are used in many cases. With regard to the pixels in the stripe array, for example, the respective sub pixels of R, G, and B (red, green, and blue) are set to be vertically-long rectangular, a single display pixel is constructed by arranging those three sub pixels in a longitudinal direction or a lateral direction.

On the other hand, in recent years, the pixels in the square array may also be used. With regard to the pixels in the square array, for example, the respective sub pixels of R, G, B, and W (red, green, blue, and white) are set to be square, and a single pixel is constructed by arranging those four sub pixels in two rows and two columns (four-quadrant shape). By using the pixels in the square array, for example, it is possible to increase a luminance value of the individual display pixels.

For example, a technology of converting the pixels in the stripe array into the pixels in the square array is also proposed. That is, by obtaining and analyzing the three sub pixels constituting the display pixel at the corresponding position in the stripe array, the four sub pixels constituting the display pixel in the square array are generated, so that the pixels in the stripe array are converted into the pixels in the square array.

In a case where the three-dimensional display using the multi-view point image is carried out by using the pixels in the square array, the four sub pixels constituting the single display pixel are to be rearranged in accordance with the shape of the parallax barrier.

For example, a consideration will be given of a case in which a two-dimensional image composed of the display pixels where the three sub pixels are arranged in a row in the lateral direction corresponding to an image composed of the pixels in the stripe array is converted into an n-th view point image in a three-dimensional display corresponding to corresponding to an image composed of the pixels in the square array.

Figure 4:
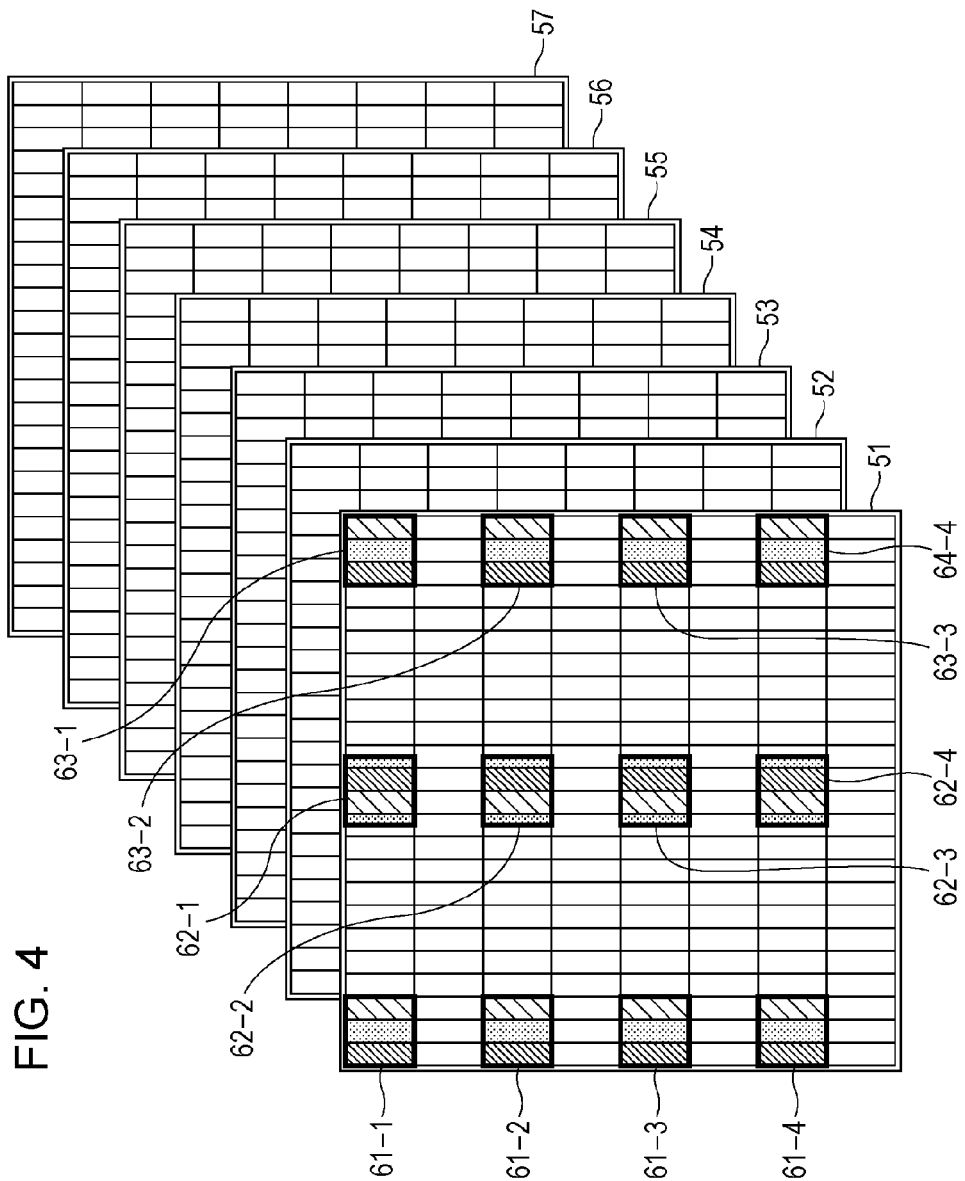
FIG. 4 illustrates an example of a case in which a three-dimensional display using an image of multiple view points is carried out through a straight barrier system.
Figure 5:
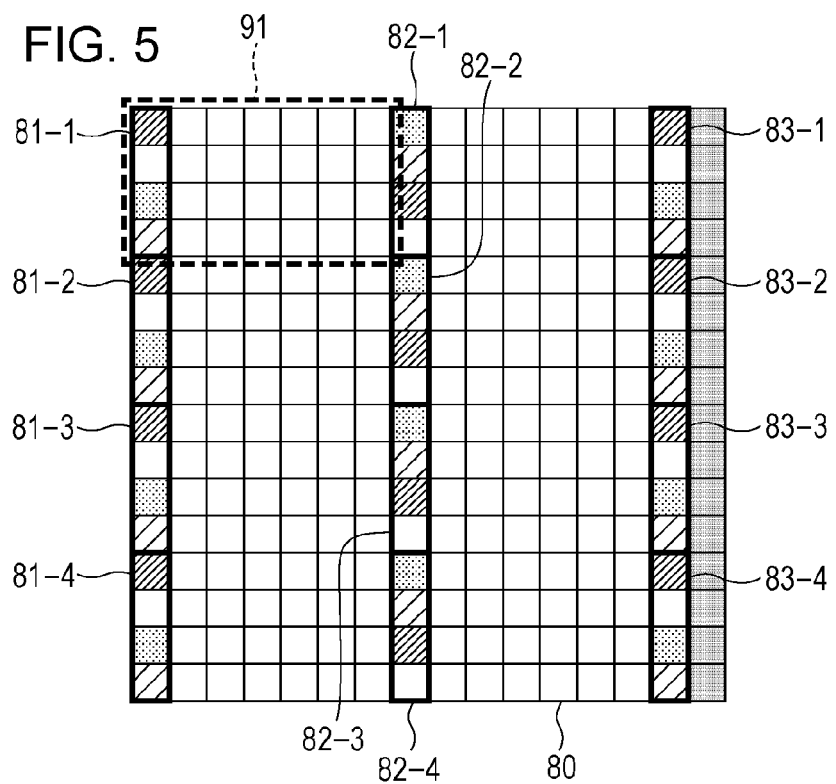
FIG. 5 illustrates another example of the case in which the three-dimensional display using the image of the multiple view points is carried out through the straight barrier system.

FIG. 4 and FIG. 5 illustrate an example of a case in which a three-dimensional display is carried out by a first view point image to a seventh view point image.

FIG. 4 illustrates a two-dimensional image composed of the display pixels where the three sub pixels are arranged in a row in the lateral direction (horizontal direction) corresponding to an image composed of the pixels in the stripe array. In FIG. 4, respective images corresponding to the seven view points are represented by an image 51 to an image 57. That is, the image 51 is set as the first view point image, the image 52 is set as the second view point image, . . . , and the image 57 is set as the seventh view point image.

In a case where the three-dimensional display is carried out by the first view point image to the seventh view point image, the image 51 to the image 57 are to be synthesized to form a single screen image. Then, the respective sub pixels constituting the display pixels in the square array in the synthesized image are to be generated from the respective sub pixels constituting the display pixels in the stripe array which constitutes the first view point image to the seventh view point image.

FIG. 5 illustrates an example of a single screen image 80 obtained by synthesizing the image 51 to the image 57. The image 80 is an image composed of the display pixels in the square array made of the four sub pixels. As described above, in a case where the three-dimensional display using the multi-view point image is carried out by using the display pixels in the square array, the four sub pixels constituting the single display pixel are to be rearranged in accordance with the shape of the parallax barrier. In the example of FIG. 5, normally, one display pixel constituted by combining the sub pixels in the four-quadrant shape is rearranged to be constituted by combining the sub pixels in tandem.

A rectangular area 91 illustrated in FIG. 5 represents a unit area where the display pixels of the seven view points are displayed. A display pixel 81-1 in the area 91 represents a display pixel arranged on the upper left edge of the screen corresponding to the pixels of the first view point image. It should be noted that a display pixel arranged on the upper left edge of the screen corresponding to the pixels of the second view point image is composed of the four sub pixels arranged on the right side of the display pixel 81-1 in the area 91. Furthermore, a display pixel arranged on the upper left edge of the screen corresponding to the pixels of the third view point image is composed of the four sub pixels arranged on the right side thereof. In this manner, the display pixels of the first view point image to the seventh view point image are arranged one each in the area 91.

Also, in FIG. 5, a unit area having a same shape/size as the area 91 exists on the bottom of the area 91 all the same, and a display pixel 81-2 is set as a display pixel arranged in the second from the top on the left edge of the screen corresponding to the pixels of the first view point image.

Similarly, a display pixel 81-3 is set as a display pixel arranged in the third from the top on the left edge of the screen corresponding to the pixels of the first view point image, and a display pixel 81-4 is set as a display pixel arranged on the lower left edge of the screen corresponding to the pixels of the first view point image.

To elaborate, the three unit areas having the same shape/size as the area 91 exist on the bottom of the area 91 of FIG. 5, and the display pixels of the seven view points are displayed on each of the unit areas.

Also, on the right of the area 91 of FIG. 5, the four unit areas having the same shape/size as the area 91 exists in tandem (in the vertical direction), and the display pixels of the seven view points are displayed on each of the unit areas. A display pixel 82-1 to a display pixel 82-4 is set as a pixel of the first view point image displayed on each of the unit areas.

The respective sub pixels constituting the display pixel 81-1 of FIG. 5 are generated by obtaining the respective sub pixels constituting a display pixel 61-1 of FIG. 4 and analyzing values of those sub pixels (such as a luminance value). Similarly, the respective sub pixels constituting the display pixel 81-2 of FIG. 5 are generated on the basis of the respective sub pixels constituting a display pixel 61-2 of FIG. 4. Then, the respective sub pixels constituting the display pixel 81-3 of FIG. 5 are generated on the basis of the respective sub pixels constituting a display pixel 61-3 of FIG. 4, and the respective sub pixels constituting the display pixel 81-4 of FIG. 5 are generated on the basis of the respective sub pixels constituting a display pixel 61-4 of FIG. 4.

In this manner, the respective pixels of the image 80 of FIG. 5 are generated on the basis of the pixels at locations corresponding to the image 51 to the image 57 of FIG. 4.

Also, when the image of FIG. 5 is generated from the image of FIG. 4, the pixels in the stripe array are converted into the pixels in the square array, but the resolution of the image which is set before the conversion is not changed after the conversion.

That is, the image 51 to the image 57 of FIG. 4 are respectively composed of the eight pixels (display pixels) in the vertical direction and the eight pixels (display pixels) in the horizontal direction. To elaborate, the image 51 to the image 57 of FIG. 4 is configured by including 8×8 pieces of the display pixels in the stripe array respectively composed of the three sub pixels.

The image 80 of FIG. 5 is also configured by including 8×8 pieces of the display pixels in the square array respectively composed of the four sub pixels all the same. To elaborate, the display that displays the image illustrated in FIG. 5 can display the image composed of 8×8 pieces of the display pixels each of which is configured by including two sub pixels in the horizontal direction and two sub pixels in the vertical direction. It should be noted however that in the case of FIG. 5, as described above, normally, one display pixel constituted by combining the sub pixels in the four-quadrant shape is rearranged to be constituted by combining the sub pixels in tandem. Therefore, the display or the like that displays the image illustrated in FIG. 5 originally has a resolution of 8×8, but since the sub pixels are rearranged, the resolution in the horizontal direction is set to be doubled, and the resolution in the vertical direction is set to be halved.

In this manner, when the three-dimensional display is carried out by using the multi-view point image, in a case where the pixels in the stripe array are converted into the pixels in the square array, the pixels of the image before the conversion may not correspond to the pixels of the image after the conversion on a one-to-one basis in some cases.

For example, in the image 51 of FIG. 4, the display pixels at the locations corresponding to the display pixel 82-1 to the display pixel 82-4 of FIG. 5 are not identified. In this case, a part of the display pixel in the fourth from the left of the image 51 of FIG. 4 and a part of the display pixel in the fifth from the left are caused to correspond to the display pixel 82-1 to the display pixel 82-4 of FIG. 5.

In the above-mentioned case, the pixels in the stripe array are not converted into the pixels in the square array in the related art system.

In view of the above, according to the present technology, in a case where the display pixel 82-1 to the display pixel 82-4 of FIG. 5 are generated, a virtual display pixel composed of the part of the display pixel in the fourth from the left of the image 51 of FIG. 4 and the part of the display pixel in the fifth from the left is generated. For example, in a case where the display pixel of the image 51 of FIG. 4 is composed of the sub pixels of R, G, and B in the stated order from the left, a virtual display pixel 62-1 to a virtual display pixel 62-4 including the G sub pixel and the B sub pixel of the display pixel in the fourth from the left of the image 51 and the R sub pixel and the G sub pixel of the display pixel in the fifth from the left are generated. It should be noted however that the G sub pixels of the virtual display pixel 62-1 to the virtual display pixel 62-4 are composed of a half of the G sub pixel of the display pixel in the fourth from the left and a half of the G sub pixel of the display pixel in the fifth from the left.

According to the present technology, for example, the R sub pixel of the virtual display pixel 62-1, that is, the R sub pixel of the display pixel in the fifth from the left of the image 51 is regarded as the R sub pixel of the display pixel before the conversion. Also, the R sub pixel of the virtual display pixel 62-1, that is, the B sub pixel of the display pixel in the fourth from the left of the image 51 is regarded as the B sub pixel of the display pixel before the conversion. Then, according to the present technology, a sub pixel obtained as an average value of the value of the G sub pixel of the display pixel in the fourth from the left of the image 51 and the value of the G sub pixel of the display pixel in the fifth from the left is regarded as the G sub pixel of the display pixel before the conversion.

Subsequently, on the basis of the values of the respective sub pixels of R, G, and B before the conversion, the values of the respective sub pixels of R, G, B, and W after the conversion are obtained, and the display pixel 82-1 is generated.

The display pixel 82-2 to the display pixel 82-4 are also similarly generated.

Herein, the description has been given in which the sub pixel obtained as the average value of the value of the G sub pixel of the display pixel in the fourth from the left of the image 51 and the value of the G sub pixel of the display pixel in the fifth from the left is regarded as the G sub pixel of the display pixel before the conversion, but a system other than the above-mentioned system may also be employed.

For example, among the value of the G sub pixel of the display pixel in the fourth from the left of the image 51 and the value of the G sub pixel of the display pixel in the fifth from the left, the sub pixel obtained as the higher value may be regarded as the G sub pixel of the display pixel before the conversion.

Alternatively, also, for example, among the value of the G sub pixel of the display pixel in the fourth from the left of the image 51 and the value of the G sub pixel of the display pixel in the fifth from the left, the sub pixel obtained as the lower value may be regarded as the G sub pixel of the display pixel before the conversion.

It should be noted that a display pixel 83-1 to a display pixel 83-4 in FIG. 5 are generated on the basis of a display pixel 63-1 to a display pixel 63-4 in the image 51 of FIG. 4, but on the right side of the display pixel 83-1 to the display pixel 83-4 in FIG. 5, the corresponding pixel in FIG. 4 is not obtained. For this reason, the sub pixel on the right side of the display pixel 83-1 to the display pixel 83-4 is set, for example, as black (OFF).

In the above-mentioned manner, 12 pixels of the first view point image in the image 80 of FIG. 5 are generated from the image 51 of FIG. 4. Similarly, 12 pixels of the second view point image in the image 80 of FIG. 5 are generated from the image 52 of FIG. 4. Also, 12 pixels of the third view point image in the image 80 of FIG. 5 are generated from the image 53 of FIGS. 4, . . . , and 12 pixels of the seventh view point image in the image 80 of FIG. 5 are generated from the image 57 of FIG. 4.

According to the present technology, the image for the three-dimensional display using the multi-view point image is generated in the above-mentioned manner, and at this time, the pixels in the stripe array are converted into the square array.

In FIG. 4 and FIG. 5, the example has been described in which the display based on the straight barrier system is assumed, but it is also possible to apply the present technology to the display based on the step barrier system.

Figure 6:
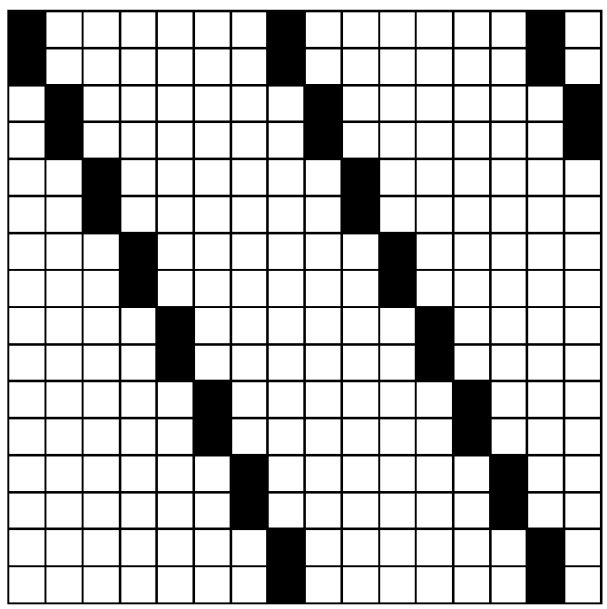
FIG. 6 illustrates display positions of pixels of a first view point image in the three-dimensional display based on the step barrier system.

For example, a consideration will be given of a step barrier having a shape illustrated in FIG. 6. FIG. 6 illustrates display positions of the pixels of the first view point image in the display based on the step barrier system. The sub pixels constituting the display pixels of the first view point image are respectively arranged at positions of black squares in FIG. 6. In FIG. 6, the display pixels are set as the pixels in the square array and composed, for example, of four sub pixels of R, G, B, and W. Two sub pixels arranged in the vertical direction in FIG. 6 and two sub pixels arranged in the vertical direction on a lower right thereof constitute a single display pixel.

Figure 7:
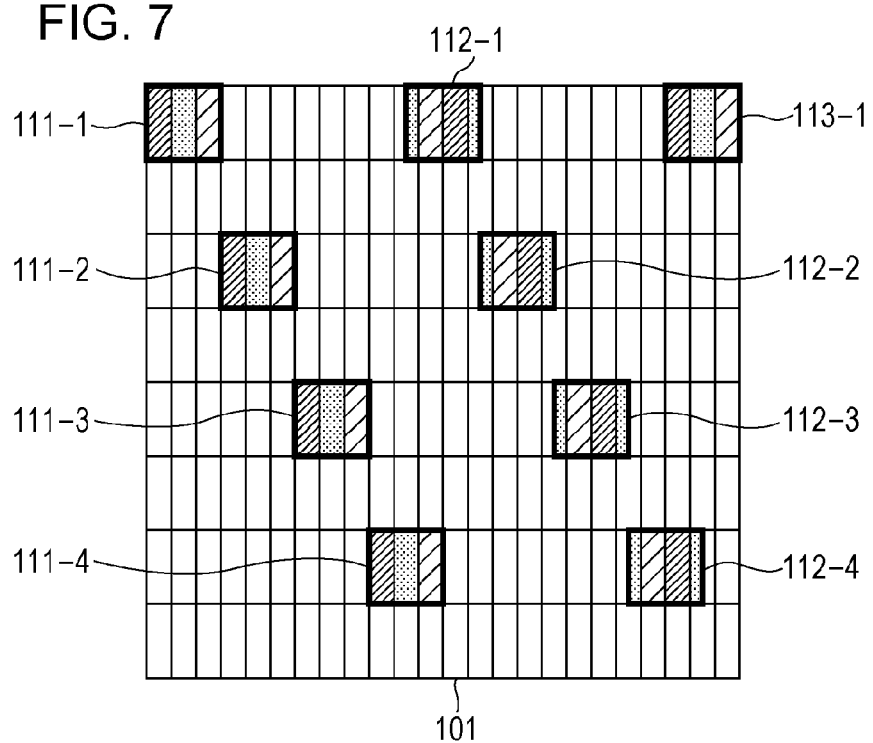
FIG. 7 illustrates an image before a conversion of the first view point image in the three-dimensional display based on the step barrier system.
Figure 8:
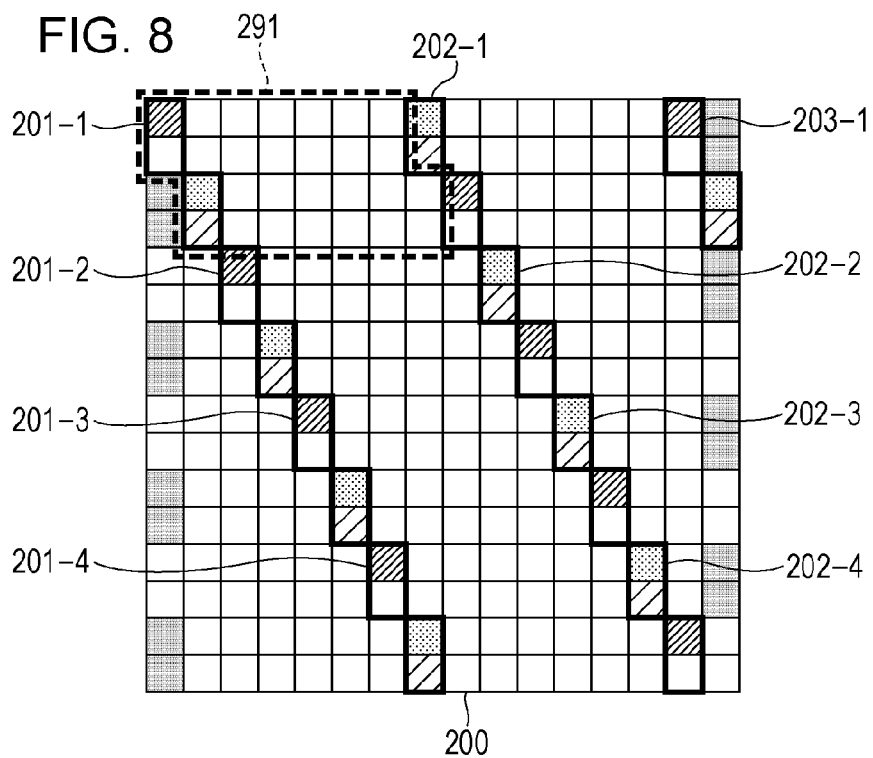
FIG. 8 illustrates an image after the conversion of the first view point image in the three-dimensional display based on the step barrier system.

FIG. 7 and FIG. 8 are explanatory drawings for describing the display based on the step barrier system having the shape illustrated in FIG. 6 in a case where the three-dimensional display using the first view point image to the seventh view point image are carried out. FIG. 7 and FIG. 8 are drawings particularly paying attention to the first view point image.

FIG. 7 illustrates a two-dimensional image composed of the display pixels where the three sub pixels are arranged in a row in the lateral direction corresponding to an image composed of the pixels in the stripe array, and this image 101 is set as the first view point image.

FIG. 8 illustrates an example of a single screen image 200 obtained by synthesizing the first view point image to the seventh view point image with each other. The image 200 is set as an image composed of the pixels in the square array made of the four sub pixels. As described above, in a case where the three-dimensional display using the multi-view point image is carried out by using the pixels in the square array, the four sub pixels constituting the single display pixel are to be rearranged in accordance with the shape of the parallax barrier. In the example of FIG. 8, normally, one display pixel constituted by combining the sub pixels in the four-quadrant shape is rearranged to be constituted by combining the sub pixels in the step shape.

A rectangular area 291 illustrated in FIG. 8 represents a unit area where the display pixels of the seven view points are displayed. A display pixel 201-1 in the area 291 represents a display pixel arranged on the upper left edge of the screen corresponding to the pixels of the first view point image. It should be noted that four sub pixels having a step shape arranged on the right of the display pixel 201-1 in the area 291 corresponding to the pixels of the second view point image constitute the display pixel arranged on the upper left edge of the screen. Furthermore, four sub pixels having a step shape arranged on the right thereof constitute the display pixel arranged on the upper left edge of the screen corresponding to the pixels of the third view point image. In this manner, the display pixels of the first view point image to the seventh view point image are arranged one each in the area 291.

Also, in FIG. 8, a unit area having a same shape/size as the area 291 exists on the lower right of the area 291 all the same, and a display pixel 201-2 is set as a display pixel arranged in the second from the top on the left side of the screen corresponding to the pixels of the first view point image.

Similarly, a display pixel 201-3 is set as a display pixel arranged in the third from the top on the left side of the screen corresponding to the pixels of the first view point image, and a display pixel 201-4 is set as a display pixel arranged in the fourth from the top on the left side of the screen corresponding to the pixels of the first view point image.

To elaborate, three unit areas having the same shape/size as the area 291 exist in the lower right direction of the area 291 of FIG. 8, and on each of the unit areas, the display pixels of the seven view points are displayed.

Also, the unit area having the same shape/size as the area 291 exists on the right of the area 291 of FIG. 8, and the display pixels of the seven view points are displayed on the unit area all the same, and a display pixel 202-1 is set as a pixel of the first view point image that is displayed in the unit area.

Similarly, a display pixel 202-2 to a display pixel 202-4, and a display pixel 203-1 are set as the display pixels of the first view point image in the respective areas.

The respective sub pixels constituting the display pixel 201-1 of FIG. 8 are generated by obtaining respective sub pixels constituting a display pixel 111-1 of FIG. 7 and analyzing values of those sub pixels (luminance values or the like). Similarly, the respective sub pixels constituting the display pixel 201-2 of FIG. 8 are generated on the basis of respective sub pixels constituting a display pixel 111-2 of FIG. 7. Then, the respective sub pixels constituting the display pixel 201-3 of FIG. 8 are generated on the basis of respective sub pixels constituting a display pixel 111-3 of FIG. 7, and the respective sub pixels constituting the display pixel 201-4 of FIG. 8 are generated on the basis of respective sub pixels constituting a display pixel 111-4 of FIG. 7.

In this manner, the respective pixels of the image 200 of FIG. 8 are generated on the basis of the pixels at corresponding locations in the image 101 of FIG. 7 or the like.

Also, when the image of FIG. 8 is generated from the image of FIG. 7, the pixels in the stripe array are converted into the pixels in the square array, but the resolution of the image set before the conversion is not changed after the conversion.

That is, the image 101 of FIG. 7 is composed of the eight pixels (display pixels) in the vertical direction and the eight pixels (display pixels) in the horizontal direction, respectively. To elaborate, the image 101 of FIG. 7 is configured by including 8×8 pieces of the display pixels in the stripe array respectively composed of the three sub pixels.

The image 200 of FIG. 8 is also configured by including 8×8 pieces of the display pixels in the square array respectively composed of the four sub pixels all the same. To elaborate, the display that displays the image illustrated in FIG. 8 can display the image composed of 8×8 pieces of the display pixels each of which is configured by including two sub pixels in the horizontal direction and two sub pixels in the vertical direction. It should be noted however that in the case of FIG. 8, as described above, normally, one display pixel constituted by combining the sub pixels in the four-quadrant shape is rearranged to be constituted by combining the sub pixels in the step shape. Therefore, the display or the like that displays the image illustrated in FIG. 8 originally has a resolution of 8×8, but since the sub pixels are rearranged, the resolution in the horizontal direction is set to be doubled, and the resolution in the vertical direction is set to be halved.

In this manner, when the three-dimensional display is carried out by using the multi-view point image, in a case where the pixels in the stripe array are converted into the pixels in the square array, the pixels of the image before the conversion may not correspond to the pixels of the image after the conversion on a one-to-one basis in some cases.

For example, in the image 101 of FIG. 7, the display pixels at the locations corresponding to the display pixel 202-1 to the display pixel 202-4 of FIG. 8 are not identified. In this case, for example, a part of the display pixel in the fourth from the left of the image 101 of FIG. 7 and a part of the display pixel in the fifth from the left are caused to correspond to the display pixel 202-1 of FIG. 8.

In the above-mentioned case, the pixels in the stripe array are not converted into the pixels in the square array in the related art system.

In view of the above, according to the present technology, similarly as in the case described above with reference to FIG. 4 and FIG. 5, for example, in a case where the display pixel 202-1 of FIG. 8 is generated, a virtual display pixel composed of the part of the display pixel in the fourth from the left of the image 101 of FIG. 7 and the part of the display pixel in the fifth from the left is generated. For example, in a case where the display pixel of the image 101 of FIG. 7 is composed of the sub pixels of R, G, and B in the stated order from the left, a virtual display pixel 112-1 including the G sub pixel and the B sub pixel of the display pixel in the fourth from the left of the image 101 and the R sub pixel and the G sub pixel of the display pixel in the fifth from the left is generated. It should be noted however that the G sub pixel of the virtual display pixel 112-1 is composed of a half of the G sub pixel of the display pixel in the fourth from the left and a half of the G sub pixel of the display pixel in the fifth from the left.

In a similar manner, a virtual display pixel 112-2 to a virtual display pixel 112-4 are also generated.

Similarly as in the above-mentioned case, according to the present technology, for example, the R sub pixel of the virtual display pixel 112-1, that is, the R sub pixel of the display pixel in the fifth from the left of the image 101 is regarded as the R sub pixel of the display pixel before the conversion. Also, the B sub pixel of the virtual display pixel 112-1, that is, the B sub pixel of the display pixel in the fourth from the left of the image 101 is regarded as the B sub pixel of the display pixel before the conversion. Then, according to the present technology, a sub pixel obtained as an average value of the value of the G sub pixel of the display pixel in the fourth from the left of the image 101 and the value of the G sub pixel of the display pixel in the fifth from the left is regarded as the G sub pixel of the display pixel before the conversion.

Subsequently, on the basis of the values of the respective sub pixels of R, G, and B before the conversion, the values of the respective sub pixels of R, G, B, and W after the conversion are obtained, and the display pixel 202-1 is generated.

The display pixel 202-2 to the display pixel 202-4 are also similarly generated.

Herein, the description has been given in which the sub pixel obtained as the average value of the value of the G sub pixel of the display pixel in the fourth from the left of the image 101 and the value of the G sub pixel of the display pixel in the fifth from the left is regarded as the G sub pixel of the display pixel before the conversion, but a system other than the above-mentioned system may also be employed.

For example, among the value of the G sub pixel of the display pixel in the fourth from the left of the image 101 and the value of the G sub pixel of the display pixel in the fifth from the left, the sub pixel obtained as the higher value may be regarded as the G sub pixel of the display pixel before the conversion.

Alternatively, also, for example, among the value of the G sub pixel of the display pixel in the fourth from the left of the image 101 and the value of the G sub pixel of the display pixel in the fifth from the left, the sub pixel obtained as the lower value may be regarded as the G sub pixel of the display pixel before the conversion.

It should be noted that the display pixel 203-1 in FIG. 8 is generated on the basis of a display pixel 113-1 in the image 101 of FIG. 7. Also, in FIG. 8, the square hatched to be displayed in gray represents a sub pixel displayed in black since the square does not obtain the corresponding pixel.

Figure 9:
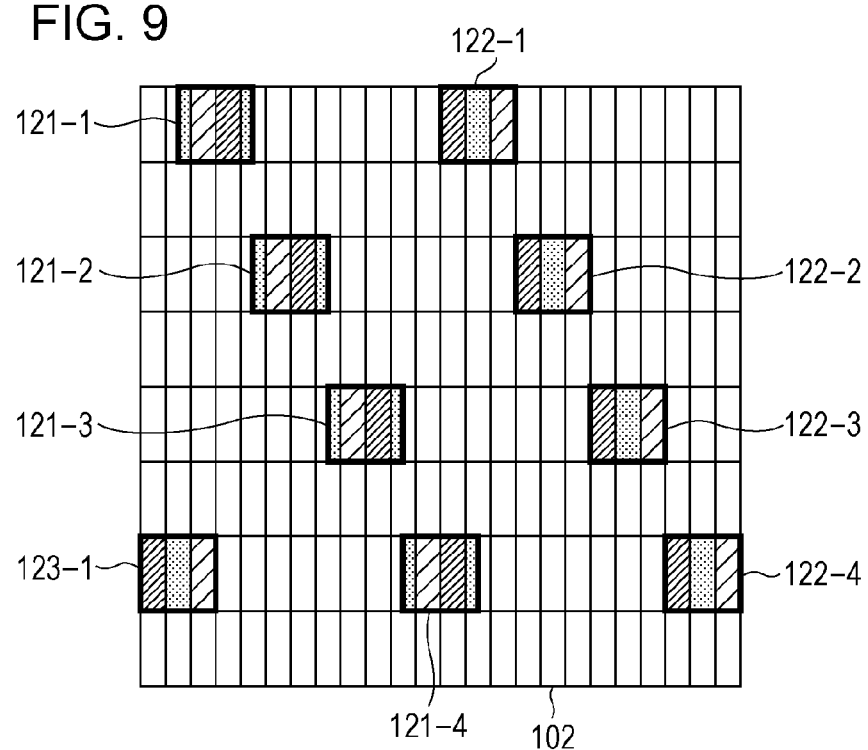
FIG. 9 illustrates an image before a conversion of a second view point image in the three-dimensional display based on the step barrier system.
Figure 10:
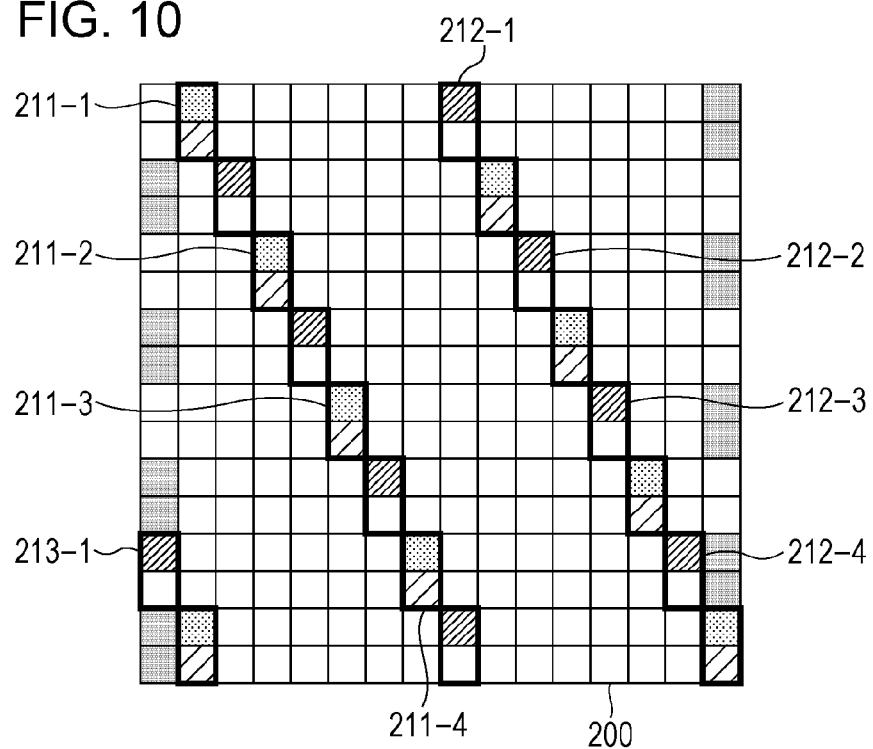
FIG. 10 illustrates an image after the conversion of the second view point image in the three-dimensional display based on the step barrier system.

FIG. 9 and FIG. 10 are further explanatory drawings for describing the display based on the step barrier system having the shape illustrated in FIG. 6 in a case where the three-dimensional display using the first view point image to the seventh view point image are carried out. FIG. 9 and FIG. 10 are drawings particularly paying attention to the second view point image.

FIG. 9 illustrates a two-dimensional image composed of the display pixels where the three sub pixels are arranged in a row in the lateral direction corresponding to an image composed of the pixels in the stripe array, and this image 102 is set as the second view point image.

In the present case, for example, when a display pixel 211-1 of FIG. 10 is generated, a virtual display pixel composed of a part of the display pixel in the first from the left of the image 102 of FIG. 9 and a part of the display pixel in the second from the left is generated. For example, a virtual display pixel 121-1 including the G sub pixel and the B sub pixel of the display pixel in the first from the left of the image 102 and the R sub pixel and the G sub pixel of the display pixel in the second from the left is generated. It should be noted however that the G sub pixel of the virtual display pixel 121-1 is composed of a half of the G sub pixel of the display pixel in the first from the left and a half of the G sub pixel of the display pixel in the second from the left.

In a similar manner, a virtual display pixel 121-2 to a virtual display pixel 121-4 are also generated.

Similarly as in the above-mentioned case, according to the present technology, for example, the R sub pixel of the virtual display pixel 121-1, that is, the R sub pixel of the display pixel in the second from the left of the image 102 is regarded as the R sub pixel of the display pixel before the conversion. Also, the B sub pixel of the virtual display pixel 121-1, that is, the B sub pixel of the display pixel in the first from the left of the image 102 is regarded as the B sub pixel of the display pixel before the conversion. Then, according to the present technology, the sub pixel obtained as an average value of a value of the G sub pixel of the display pixel in the first from the left of the image 102 and a value of the G sub pixel of the display pixel in the second from the left is regarded as the G sub pixel of the display pixel before the conversion.

Also, with regard to the G sub pixel of the virtual display pixel 121-1, among the values of the two sub pixels, the sub pixel obtained as the higher value may be regarded as the G sub pixel of the display pixel before the conversion, and the sub pixel obtained as the lower value may be regarded as the G sub pixel of the display pixel before the conversion.

Subsequently, on the basis of the values of the respective sub pixels of R, G, and B before the conversion, the values of the respective sub pixels of R, G, B, and W after the conversion are obtained, and the display pixel 211-1 is generated.

A display pixel 211-2 to a display pixel 211-4 are also similarly generated.

Also, a display pixel 212-1 to a display pixel 212-4 of FIG. 10 are generated on the basis of a display pixel 122-1 to a display pixel 122-4 of FIG. 9. A display pixel 213-1 of FIG. 10 is generated on the basis of a display pixel 123-1 of FIG. 9. Furthermore, in FIG. 10, the square hatched to be displayed in gray represents a sub pixel displayed in black since the square does not obtain the corresponding pixel.

Figure 11:
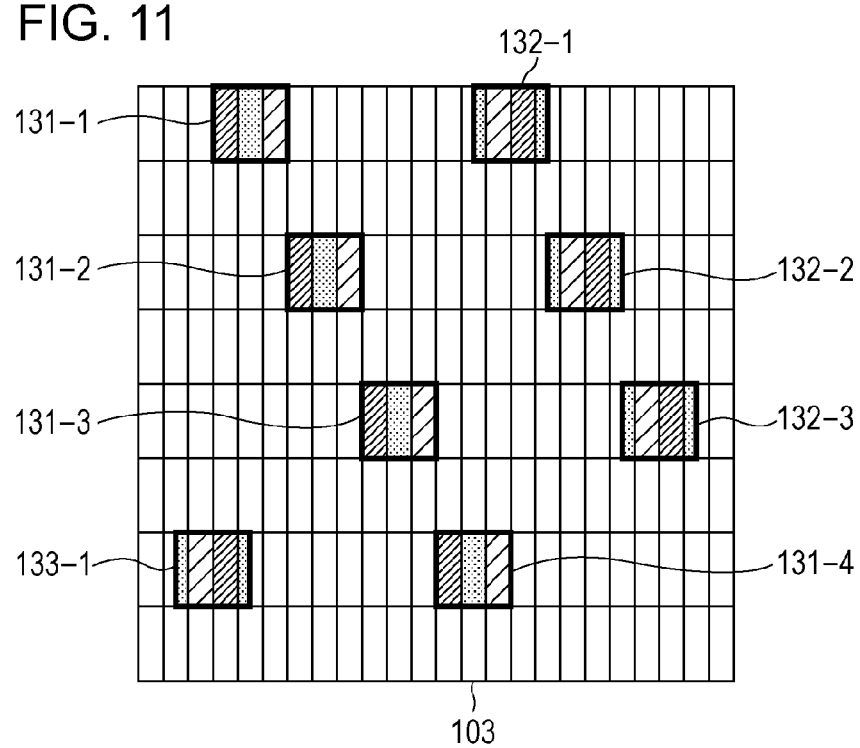
FIG. 11 illustrates an image before a conversion of a third view point image in the three-dimensional display based on the step barrier system.
Figure 12:
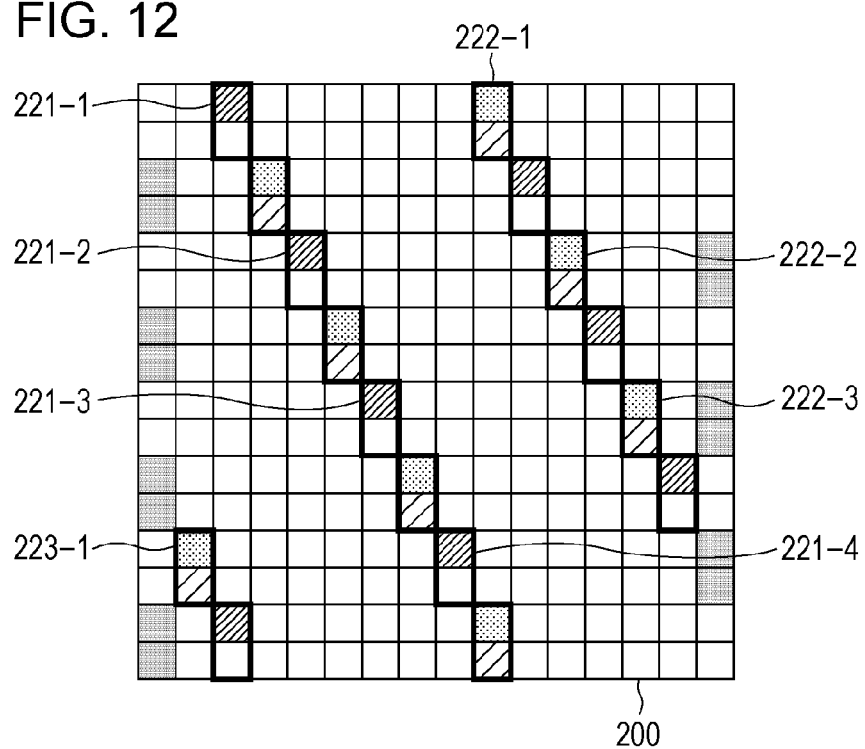
FIG. 12 illustrates an image after the conversion of the third view point image in the three-dimensional display based on the step barrier system.

FIG. 11 and FIG. 12 are further explanatory drawings for describing the display based on the step barrier system having the shape illustrated in FIG. 6 in a case where the three-dimensional display using the first view point image to the seventh view point image are carried out. FIG. 11 and FIG. 12 are drawings particularly paying attention to the third view point image.

FIG. 11 illustrates a two-dimensional image composed of the display pixels where the three sub pixels are arranged in a row in the lateral direction corresponding to an image composed of the pixels in the stripe array, and this image 103 is set as the third view point image.

In the present case, for example, when a display pixel 222-1 of FIG. 12 is generated, a virtual display pixel composed of a part of the display pixel in the fifth from the left of the image 103 of FIG. 11 and a part of the display pixel in the sixth from the left is generated. For example, a virtual display pixel 132-1 including the G sub pixel and the B sub pixel of the display pixel in the fifth from the left of the image 103 and the R sub pixel and the G sub pixel the display pixel in the sixth from the left. It should be noted however that the G sub pixel of the virtual display pixel 132-1 is composed of a half of the G sub pixel of the display pixel in the fifth from the left and a half of the G sub pixel of the display pixel in the sixth from the left.

In a similar manner, a virtual display pixel 132-2 and a virtual display pixel 132-3 are also generated.

Similarly as in the above-mentioned case, according to the present technology, for example, the R sub pixel of the virtual display pixel 132-1, that is, the R sub pixel of the display pixel in the sixth from the left of the image 103 is regarded as the R sub pixel of the display pixel before the conversion. Also, the B sub pixel of the virtual display pixel 132-1, that is, the B sub pixel of the display pixel in the fifth from the left of the image 103 is regarded as the B sub pixel of the display pixel before the conversion. Then, according to the present technology, a sub pixel obtained as an average value of a value of the G sub pixel of the display pixel in the fifth from the left of the image 103 and a value of the G sub pixel of the display pixel in the sixth from the left is regarded as the G sub pixel of the display pixel before the conversion.

Also, with regard to the G sub pixel of the virtual display pixel 132-1, among the two sub pixel values, the sub pixel obtained as the higher value may be regarded as the G sub pixel of the display pixel before the conversion, and the sub pixel obtained as the lower value may be regarded as the G sub pixel of the display pixel before the conversion.

Subsequently, on the basis of the values of the respective sub pixels of R, G, and B before the conversion, the values of the respective sub pixels of R, G, B, and W after the conversion are obtained, and the display pixel 222-1 is generated.

A display pixel 222-2 and a display pixel 222-3 are also similarly generated.

Also, a display pixel 221-1 to a display pixel 221-4 of FIG. 12 are generated on the basis of a display pixel 131-1 to a display pixel 131-4 of FIG. 11. A display pixel 223-1 of FIG. 12 is generated on the basis of a virtual display pixel 133-1 of FIG. 11. Furthermore, in FIG. 12, the square hatched to be displayed in gray represents a sub pixel displayed in black since the square does not obtain the corresponding pixel.

Figure 13:
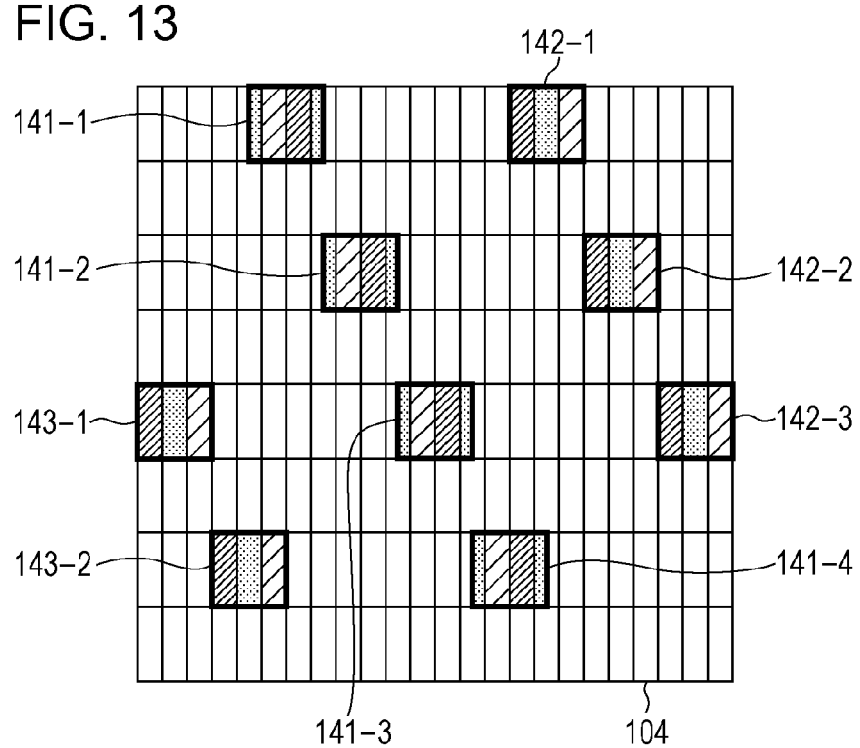
FIG. 13 illustrates an image before a conversion of a fourth view point image in the three-dimensional display based on the step barrier system.
Figure 14:
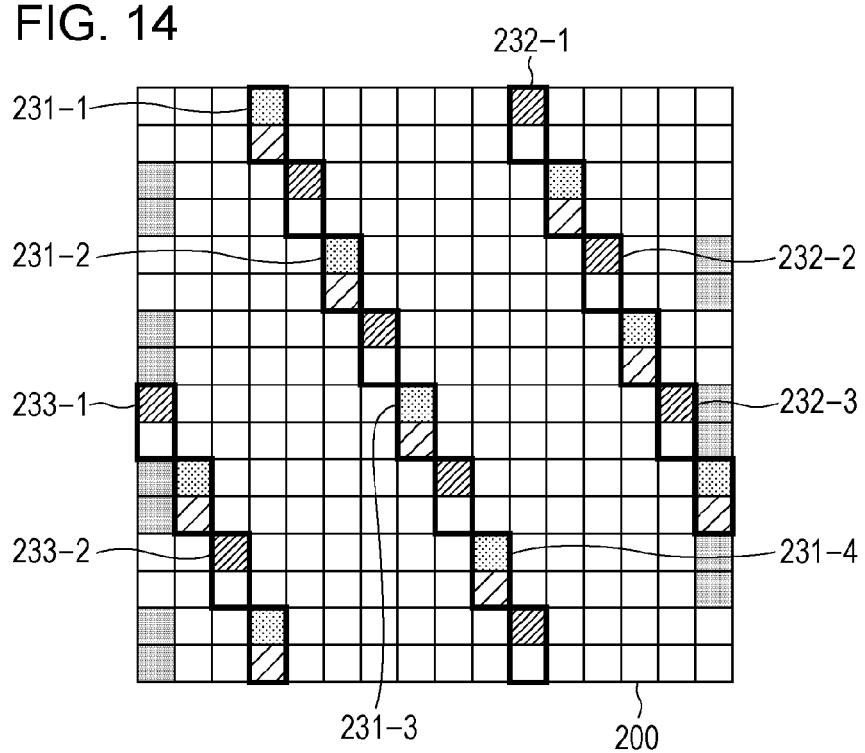
FIG. 14 illustrates an image after the conversion of the fourth view point image in the three-dimensional display based on the step barrier system.

FIG. 13 and FIG. 14 are further explanatory drawings for describing the display based on the step barrier system having the shape illustrated in FIG. 6 in a case where the three-dimensional display using the first view point image to the seventh view point image are carried out. FIG. 13 and FIG. 14 are drawings particularly paying attention to the fourth view point image.

FIG. 13 illustrates a two-dimensional image composed of the display pixels where the three sub pixels are arranged in a row in the lateral direction corresponding to an image composed of the pixels in the stripe array, and this image 104 is set as the fourth view point image.

In the present case, for example, when a display pixel 231-1 of FIG. 14 is generated, a virtual display pixel composed of a part of the display pixel in the second from the left of the image 104 of FIG. 13 and a part of the display pixel in the third from the left is generated. For example, a virtual display pixel 141-1 including the G sub pixel and the B sub pixel of the display pixel in the second from the left of the image 104 and the R sub pixel and the G sub pixel of the display pixel in the third from the left is generated. It should be noted however that the G sub pixel of the virtual display pixel 141-1 is composed of a half of the G sub pixel of the display pixel in the second from the left and a half of the G sub pixel of the display pixel in the third from the left.

In a similar manner, a virtual display pixel 141-2 to a virtual display pixel 141-4 are also generated.

Similarly as in the above-mentioned case, according to the present technology, for example, the R sub pixel of the virtual display pixel 141-1, that is, the R sub pixel of the display pixel in the third from the left of the image 104 is regarded as the R sub pixel of the display pixel before the conversion. Also, the B sub pixel of the virtual display pixel 141-1, that is, the B sub pixel of the display pixel in the second from the left of the image 104 is regarded as the B sub pixel of the display pixel before the conversion. Then, according to the present technology, a sub pixel obtained as an average value of a value of the G sub pixel of the display pixel in the second from the left of the image 104 and a value of the G sub pixel of the display pixel in the third from the left is regarded as the G sub pixel of the display pixel before the conversion.

Also, with regard to the G sub pixel of the virtual display pixel 141-1, among the two sub pixel values, the sub pixel obtained as the higher value may be regarded as the G sub pixel of the display pixel before the conversion, and the sub pixel obtained as the lower value may be regarded as the G sub pixel of the display pixel before the conversion.

Subsequently, on the basis of the values of the respective sub pixels of R, G, and B before the conversion, the values of the respective sub pixels of R, G, B, and W after the conversion are obtained, and the display pixel 231-1 is generated.

A display pixel 231-2 to a display pixel 231-4 are also similarly generated.

Also, a display pixel 232-1 to a display pixel 232-3 of FIG. 14 are generated on the basis of a display pixel 142-1 to a display pixel 142-3 of FIG. 13. A display pixel 233-1 and a display pixel 233-2 of FIG. 14 are generated on the basis of a display pixel 143-1 and a display pixel 143-2 of FIG. 13. Furthermore, in FIG. 14, the square hatched to be displayed in gray represents a sub pixel displayed in black since the square does not obtain the corresponding pixel.

Figure 15:
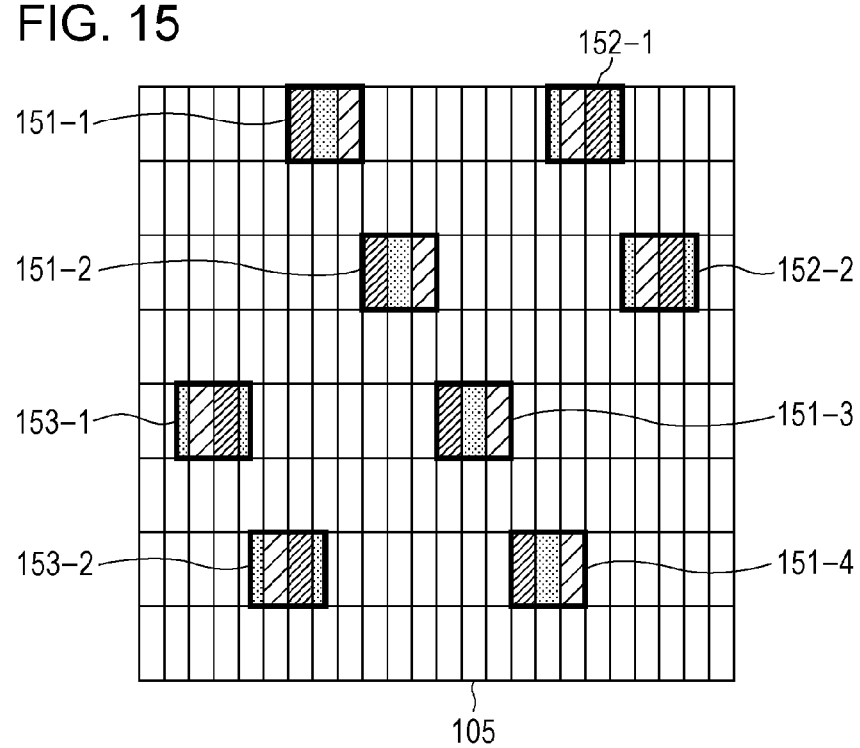
FIG. 15 illustrates an image before a conversion of a fifth view point image in the three-dimensional display based on the step barrier system.
Figure 16:
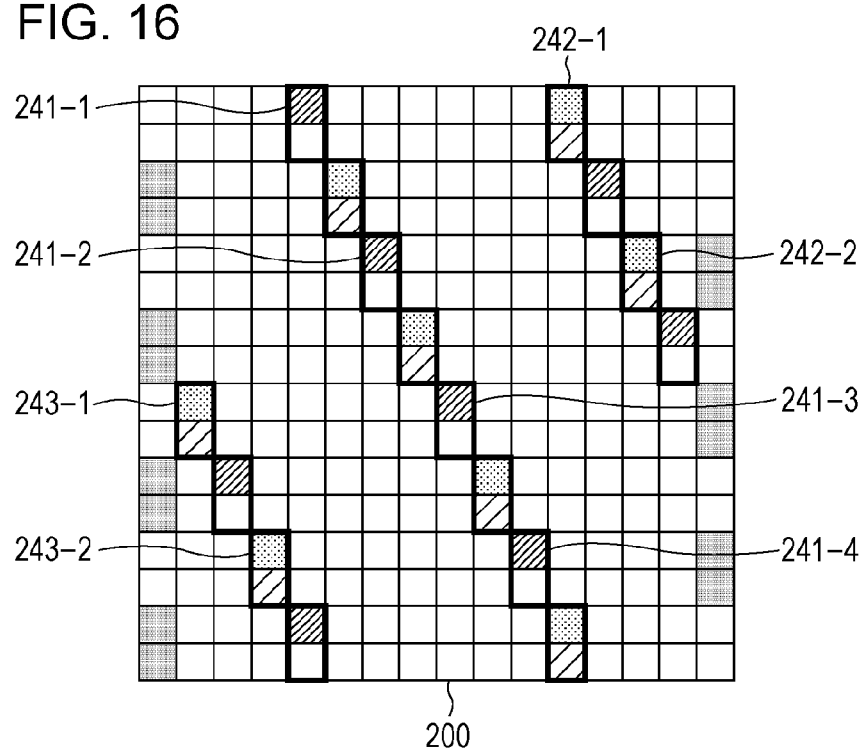
FIG. 16 illustrates an image after the conversion of the fifth view point image in the three-dimensional display based on the step barrier system.

FIG. 15 and FIG. 16 are further explanatory drawings for describing the display based on the step barrier system having the shape illustrated in FIG. 6 in a case where the three-dimensional display using the first view point image to the seventh view point image are carried out. FIG. 15 and FIG. 16 are drawings particularly paying attention to the fifth view point image.

FIG. 15 illustrates a two-dimensional image composed of the display pixels where the three sub pixels are arranged in a row in the lateral direction corresponding to an image composed of the pixels in the stripe array, and this image 105 is set as the fifth view point image.

In the present case, for example, when a display pixel 242-1 of FIG. 16 is generated, a virtual display pixel composed of a part of the display pixel in the sixth from the left of the image 105 of FIG. 15 and a part of the display pixel in the seventh from the left is generated. For example, a virtual display pixel 152-1 including the G sub pixel and the B sub pixel of the display pixel in the sixth from the left of the image 105 and the R sub pixel and the G sub pixel of the display pixel in the seventh from the left is generated. It should be noted however that the G sub pixel of the virtual display pixel 152-1 is composed of a half of the G sub pixel of the display pixel in the sixth from the left and a half of the G sub pixel of the display pixel in the seventh from the left.

In a similar manner, a virtual display pixel 152-2 is also generated.

Similarly as in the above-mentioned case, according to the present technology, for example, the R sub pixel of the virtual display pixel 152-1 is regarded as the R sub pixel of the display pixel before the conversion. Also, the B sub pixel of the virtual display pixel 152-1 is regarded as the B sub pixel of the display pixel before the conversion. Then, according to the present technology, a sub pixel obtained as an average value of a value of the G sub pixel of the display pixel in the sixth from the left of the image 105 and a value of the G sub pixel of the display pixel in the seventh from the left is regarded as the G sub pixel of the display pixel before the conversion.

Also, with regard to the G sub pixel of the virtual display pixel 152-1, among the two sub pixel values, the sub pixel obtained as the higher value may be regarded as the G sub pixel of the display pixel before the conversion, and the sub pixel obtained as the lower value may be regarded as the G sub pixel of the display pixel before the conversion.

Subsequently, on the basis of the values of the respective sub pixels of R, G, and B before the conversion, the values of the respective sub pixels of R, G, B, and W after the conversion are obtained, and the display pixel 242-1 is generated.

A display pixel 242-2 is also similarly generated.

Also, a display pixel 241-1 to a display pixel 241-4 of FIG. 16 are generated on the basis of a display pixel 151-1 to a display pixel 151-4 of FIG. 15. A display pixel 243-1 and a display pixel 243-2 of FIG. 16 are generated on the basis of a virtual display pixel 153-1 and a virtual display pixel 153-2 of FIG. 15. Furthermore, in FIG. 16, the square hatched to be displayed in gray represents a sub pixel displayed in black since the square does not obtain the corresponding pixel.

Figure 17:
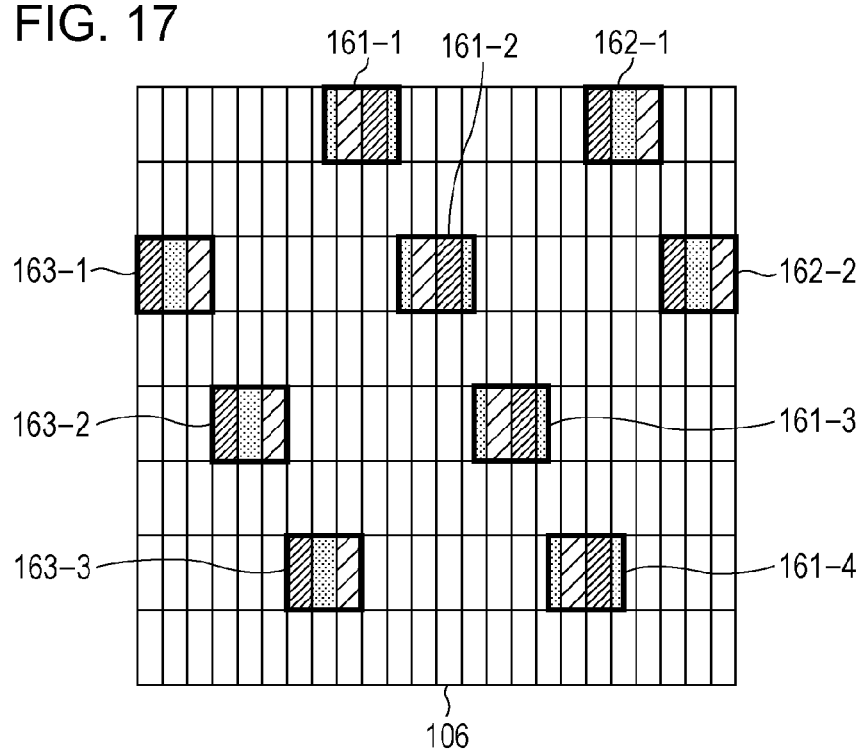
FIG. 17 illustrates an image before a conversion of a sixth view point image in the three-dimensional display based on the step barrier system.
Figure 18:
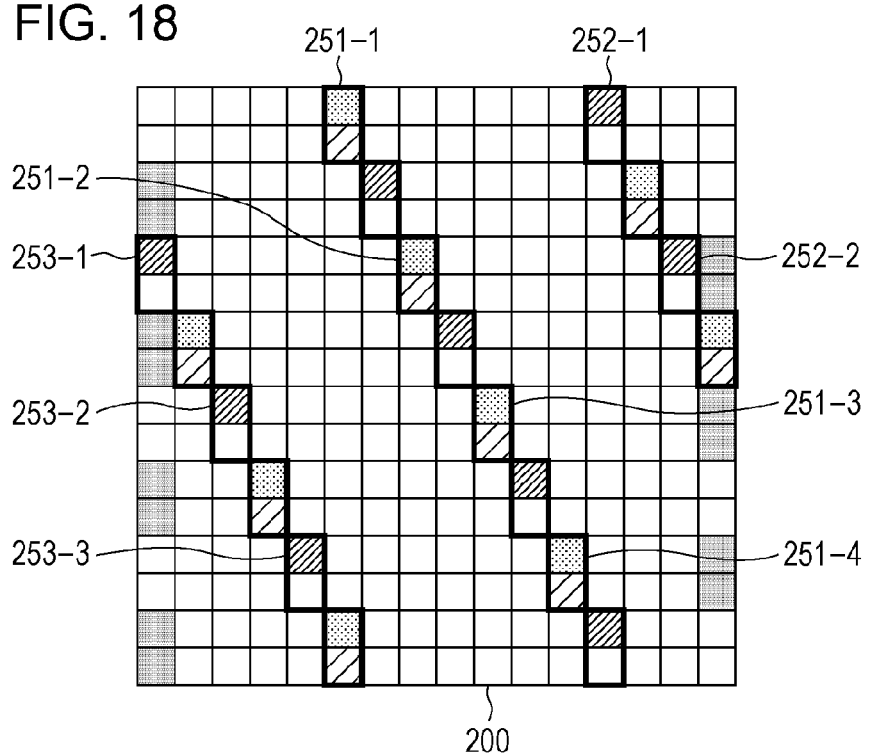
FIG. 18 illustrates an image after the conversion of the sixth view point image in the three-dimensional display based on the step barrier system.

FIG. 17 and FIG. 18 are further explanatory drawings for describing the display based on the step barrier system having the shape illustrated in FIG. 6 in a case where the three-dimensional display using the first view point image to the seventh view point image are carried out. FIG. 17 and FIG. 18 are drawings particularly paying attention to the sixth view point image.

FIG. 17 illustrates a two-dimensional image composed of the display pixels where the three sub pixels are arranged in a row in the lateral direction corresponding to an image composed of the pixels in the stripe array, and this image 106 is set as the sixth view point image.

In the present case, for example, when a display pixel 251-1 of FIG. 18 is generated, a virtual display pixel composed of a part of the display pixel in the third from the left of the image 106 of FIG. 17 and a part of the display pixel in the fourth from the left is generated. For example, a virtual display pixel 161-1 including the G sub pixel and the B sub pixel of the display pixel in the third from the left of the image 106 and the R sub pixel and the G sub pixel of the display pixel in the fourth from the left is generated. It should be noted however that the G sub pixel of the virtual display pixel 161-1 is composed of a half of the G sub pixel of the display pixel in the third from the left and a half of the G sub pixel of the display pixel in the fourth from the left.

In a similar manner, a virtual display pixel 161-2 to a virtual display pixel 161-4 are also generated.

Similarly as in the above-mentioned case, according to the present technology, for example, the R sub pixel of the virtual display pixel 161-1 is regarded as the R sub pixel of the display pixel before the conversion. Also, the B sub pixel of the virtual display pixel 161-1 is regarded as the B sub pixel of the display pixel before the conversion. Then, according to the present technology, a sub pixel obtained as an average value of a value of the G sub pixel of the display pixel in the third from the left of the image 106 and a value of the G sub pixel of the display pixel in the fourth from the left is regarded as the G sub pixel of the display pixel before the conversion.

Also, with regard to the G sub pixel of the virtual display pixel 161-1, among the two sub pixel values, the sub pixel obtained as the higher value may be regarded as the G sub pixel of the display pixel before the conversion, and the sub pixel obtained as the lower value may be regarded as the G sub pixel of the display pixel before the conversion.

Subsequently, on the basis of the values of the respective sub pixels of R, G, and B before the conversion, the values of the respective sub pixels of R, G, B, and W after the conversion are obtained, and the display pixel 202-1 is generated.

A display pixel 251-2 to a display pixel 251-4 are also similarly generated.

Also, a display pixel 252-1 and a display pixel 252-2 of FIG. 18 are generated on the basis of a display pixel 162-1 and a display pixel 162-2 of FIG. 17. A display pixel 253-1 to a display pixel 253-3 of FIG. 18 are generated on the basis of a display pixel 163-1 to a display pixel 163-3 of FIG. 17. Furthermore, in FIG. 18, the square hatched to be displayed in gray represents a sub pixel displayed in black since the square does not obtain the corresponding pixel.

Figure 19:
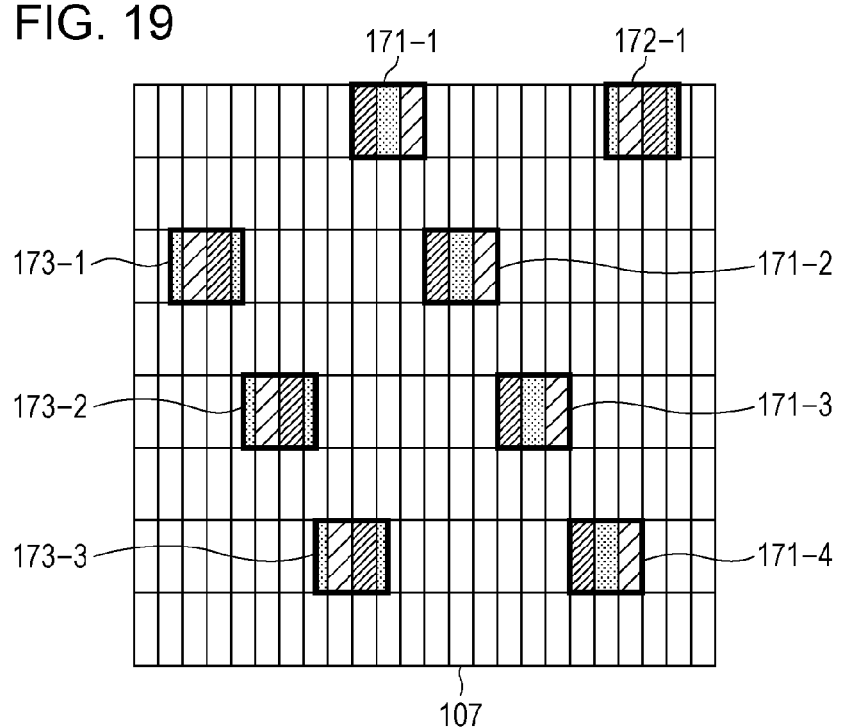
FIG. 19 illustrates an image before a conversion of a seventh view point image in the three-dimensional display based on the step barrier system.
Figure 20:
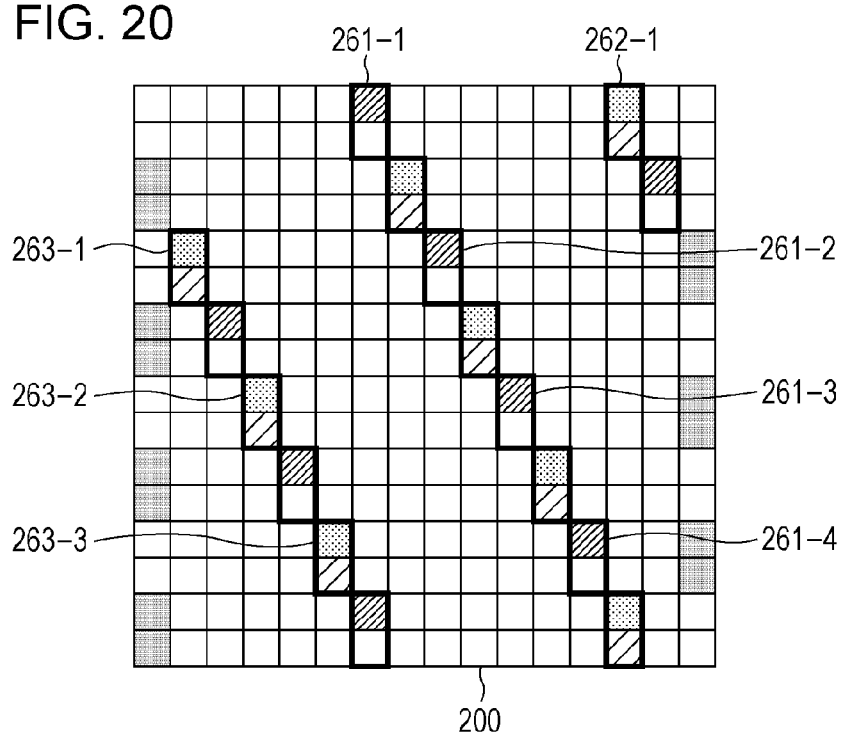
FIG. 20 illustrates an image after the conversion of the seventh view point image in the three-dimensional display based on the step barrier system.

FIG. 19 and FIG. 20 are further explanatory drawings for describing the display based on the step barrier system having the shape illustrated in FIG. 6 in a case where the three-dimensional display using the first view point image to the seventh view point image are carried out. FIG. 19 and FIG. 20 are drawings particularly paying attention to the seventh view point image.

FIG. 19 illustrates a two-dimensional image composed of the display pixels where the three sub pixels are arranged in a row in the lateral direction corresponding to an image composed of the pixels in the stripe array, and this image 107 is set as the seventh view point image.

In the present case, for example, when a display pixel 262-1 of FIG. 20 is generated, a virtual display pixel composed of a part of the display pixel in the seventh from the left of the image 107 of FIG. 19 and a part of the display pixel in the eighth from the left is generated. For example, a virtual display pixel 172-1 including the G sub pixel and the B sub pixel of the display pixel in the seventh from the left of the image 107 and the R sub pixel and the G sub pixel of the display pixel in the eighth from the left is generated. It should be noted however that the G sub pixel of the virtual display pixel 172-1 is composed of a half of the G sub pixel of the display pixel in the seventh from the left and a half of the G sub pixel of the display pixel in the eighth from the left.

Similarly as in the above-mentioned case, according to the present technology, for example, the R sub pixel of the virtual display pixel 172-1 is regarded as the R sub pixel of the display pixel before the conversion. Also, the B sub pixel of the virtual display pixel 172-1 is regarded as the B sub pixel of the display pixel before the conversion. Then, according to the present technology, a sub pixel obtained as an average of a value of the G sub pixel of the display pixel in the seventh from the left of the image 107 and a value of the G sub pixel of the display pixel in the eighth from the left is regarded as the G sub pixel of the display pixel before the conversion.

Also, with regard to the G sub pixel of the virtual display pixel 172-1, among the two sub pixel values, the sub pixel obtained as the higher value may be regarded as the G sub pixel of the display pixel before the conversion, and the sub pixel obtained as the lower value may be regarded as the G sub pixel of the display pixel before the conversion.

Subsequently, on the basis of the values of the respective sub pixels of R, G, and B before the conversion, the values of the respective sub pixels of R, G, B, and W after the conversion are obtained, and a display pixel 262-1 is generated.

Also, a display pixel 261-1 of FIG. 20 is generated on the basis of a display pixel 171-1 of FIG. 19. A display pixel 263-1 to a display pixel 263-3 of FIG. 20 are generated on the basis of a virtual display pixel 173-1 to a virtual display pixel 173-3 of FIG. 19. Furthermore, in FIG. 20, the square hatched to be displayed in gray represents a sub pixel displayed in black since the square does not obtain the corresponding pixel.

In this manner, the pixels of the first view point image to the seventh view point image 101 to 107 are synthesized with each other to generate the multi-view point image 200. For example, the images 200 illustrated in FIG. 8, FIG. 10, FIG. 12, FIG. 14, FIG. 16, FIG. 18, and FIG. 20 are synthesized as the single screen image. According to the present technology, the image for the three-dimensional display using the multi-view point image is generated in the above-mentioned manner, and at this time, the pixels in the stripe array are converted into the square array.

According to the present technology, as described above, when the pixels in the stripe array are converted into the pixels in the square array, the sub pixels are generated while taking into account a shift in the arrangements of the pixels in the stripe array and the pixels in the square array. Therefore, for example, when the arrays of the pixels in the image having the parallax are converted, it is possible to carry out the conversion while the degradation in the image quality is suppressed.

In a case where the pixels in the stripe array are converted into the square array through the system described above with reference to FIG. 4 to FIG. 20, as described above, since the sub pixels are rearranged, the resolution in the horizontal direction is set to be doubled, and the resolution in the vertical direction is set to be halved. Therefore, on the basis of one display pixel in the vertical direction of the image before the conversion, two display pixels in the vertical direction of the image after the conversion are generated.

This means that the one display pixel in the vertical direction of the image after the conversion corresponds to the two display pixels in the vertical direction of the image before the conversion. According to the system described above with reference to FIG. 4 to FIG. 20, the description has been given in which on the basis of the values of the respective sub pixels of one display pixel (or the virtual display pixel) located on the upper side in the drawing among the two display pixels in the vertical direction of the image before the conversion, the values of the respective sub pixels of the one display pixel after the conversion are obtained. However, on the basis of the values of the respective sub pixels of one display pixel (or the virtual display pixel) located on the lower side in the drawing among the two (or more) display pixels in the vertical direction of the image before the conversion, the values of the respective sub pixels of the one display pixel after the conversion can also be obtained.

Figure 21:
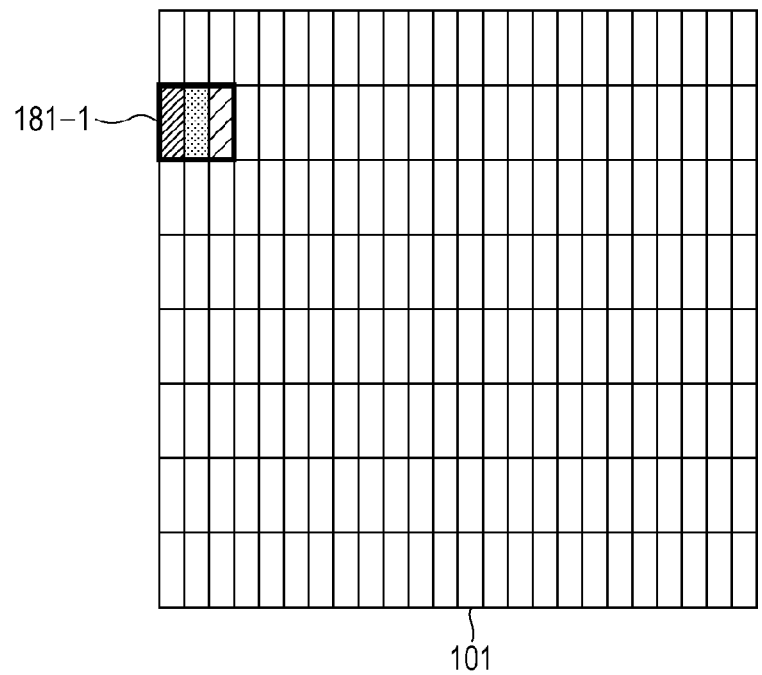
FIG. 21 is an explanatory diagram for describing another example of the correspondence relationship of the pixels before and after the conversion.

For example, the values of the respective sub pixels of the display pixel 201-1 for the first view point illustrated in FIG. 8 may be obtained on the basis of the values of the respective sub pixels of a display pixel 181-1 illustrated in FIG. 21. FIG. 21 illustrates only the display pixel 181-1, but, similarly, the display pixel for the first view point illustrated in FIG. 8 is generated on the basis of one display pixel located on the lower side in the drawing among the two display pixels in the vertical direction of the image before the conversion.

Also, in the above, the example has been described in which one display pixel (or one virtual display pixel) in the stripe array is converted into one display pixel in the square array. However, for example, two display pixels (or two virtual display pixels) in the stripe array may also be converted into two display pixels in the square array.

Figure 22:
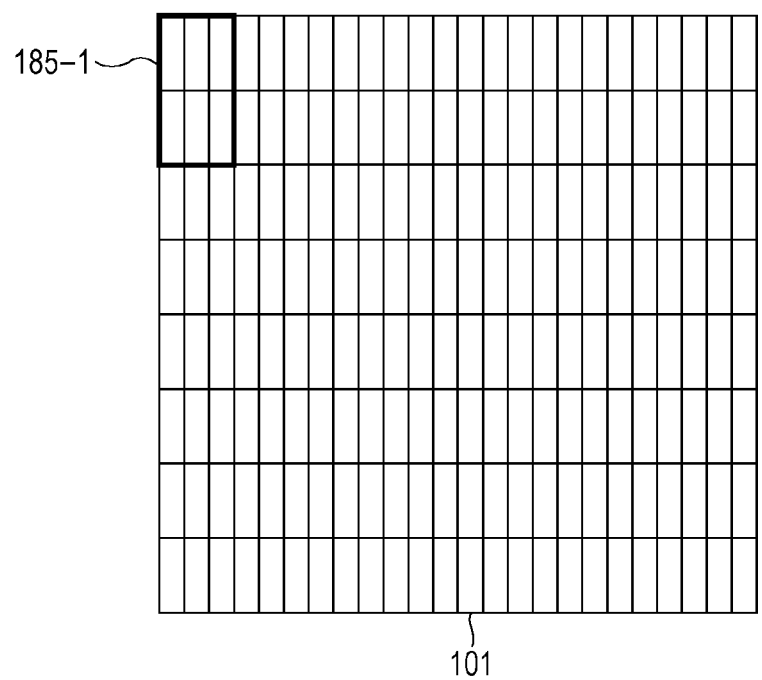
FIG. 22 is an explanatory diagram for describing still another example of the correspondence relationship of the pixels before and after the conversion.
Figure 23:
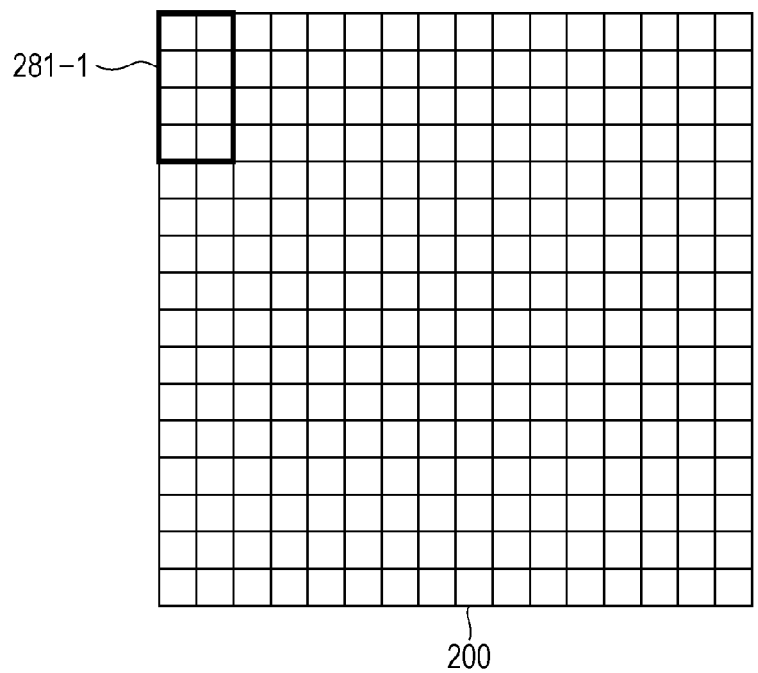
FIG. 23 is an explanatory diagram for describing still another example of the correspondence relationship of the pixels before and after the conversion.

For example, a display pixel group 281-1 for the first view point of the single screen image 200 obtained by synthesizing the first view point image to the seventh view point image with each other illustrated in FIG. 23 may be generated on the basis of a display pixel group 185-1 of the first view point image 101 illustrated in FIG. 22. That is, values of the eight sub pixels included in the display pixel group 281-1 of FIG. 23 may also be obtained on the basis of values of the six sub pixels included in the display pixel group 185-1 of FIG. 22.

In this case, for example, the six sub pixels included in the display pixel group of the image before the conversion are previously associated with the eight sub pixels included in the display pixel group of the image before the conversion, the values of the respective sub pixels after the conversion are computed on the basis of the values of the corresponding sub pixels. Alternatively, also, the values of the respective sub pixels included in the display pixel group of the image before the conversion may be averaged for each of the colors (R, G, and B), and the values of the respective sub pixels after the conversion may be computed on the basis of those average values. Furthermore, with regard to the values of the respective sub pixels included in the display pixel group of the image before the conversion, maximum values or minimum values may be selected for each of the colors (R, G, and B), and the values of the respective sub pixels after the conversion may be computed on the basis of those maximum values or minimum values.

Figure 24:
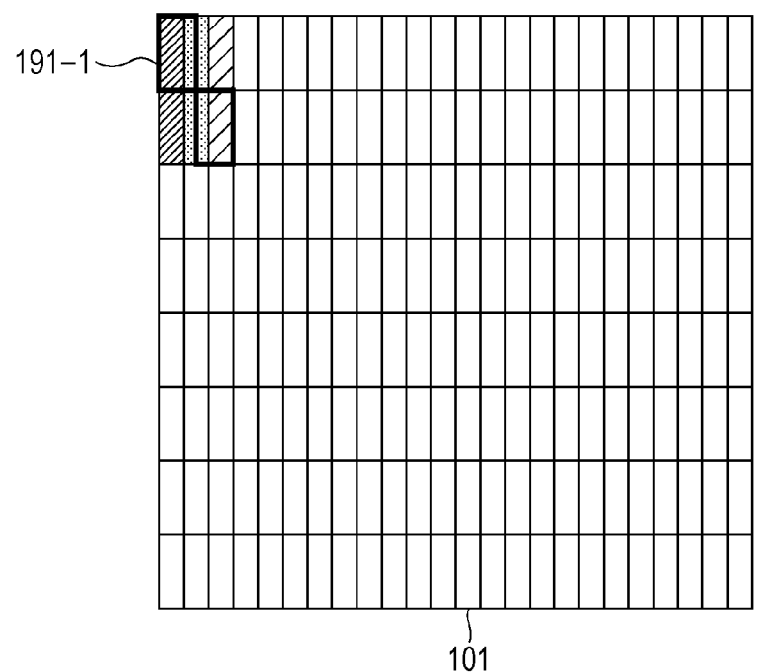
FIG. 24 is an explanatory diagram for describing still another example of the correspondence relationship of the pixels before and after the conversion.

Alternatively, the sub pixels of the pixels in the stripe array in the image before the conversion may also be extracted to have an irregular shape. For example, as illustrated in FIG. 24, the values of the respective sub pixels of the display pixel 201-1 for the first view point illustrated in FIG. 8 may be obtained on the basis of values of the sub pixels in a frame 191.

In this case, for example, the R sub pixel on the upper left edge in the drawing (in the first row and the first column) is regarded as the R sub pixel of the display pixel before the conversion, and the B sub pixel in the second row and the first column is regarded as the B sub pixel of the display pixel before the conversion. Then, a sub pixel obtained by averaging the value of the sub pixel in the first row and the second column and the value of the sub pixel in the second row and the second column is regarded as the G sub pixel of the display pixel before the conversion. It should be noted that with regard to the G sub pixel, among the two sub pixel values, a sub pixel obtained as the high value (or the low value) may also be regarded as the G sub pixel of the display pixel before the conversion.

Figure 25:
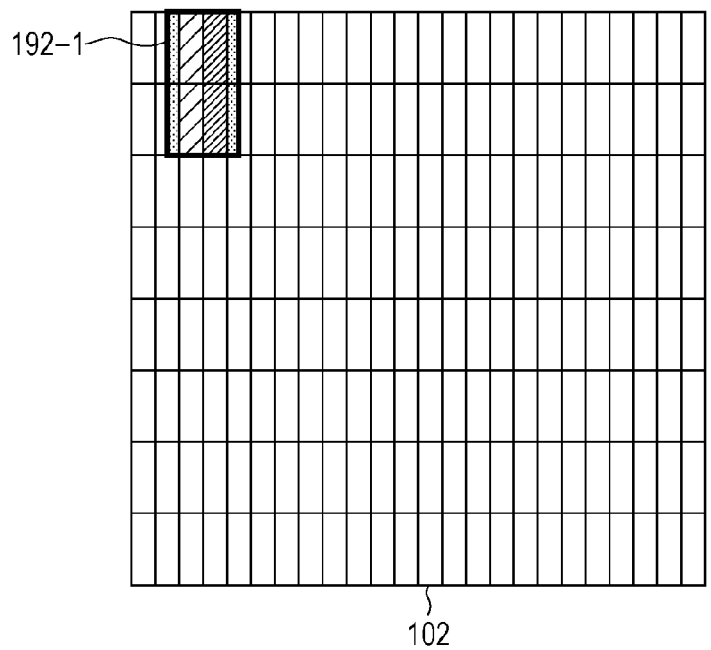
FIG. 25 is an explanatory diagram for describing still another example of the correspondence relationship of the pixels before and after the conversion.
Figure 26:
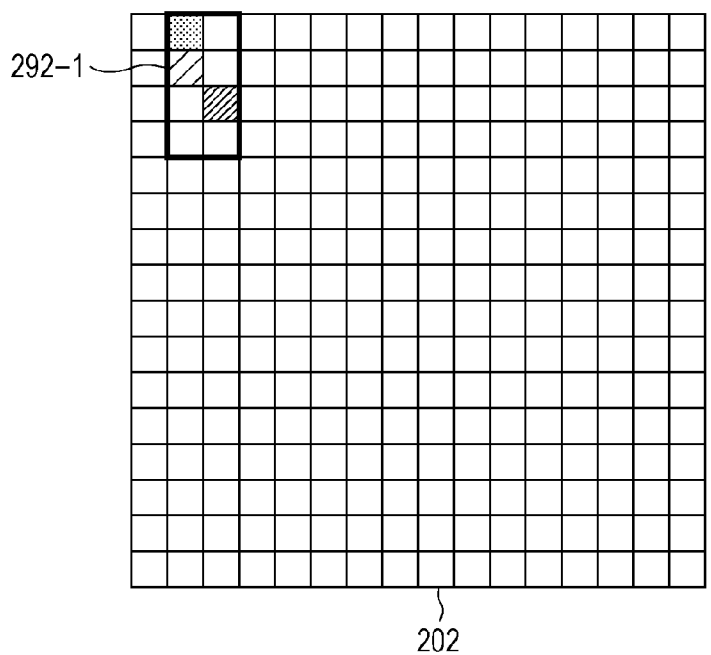
FIG. 26 is an explanatory diagram for describing still another example of the correspondence relationship of the pixels before and after the conversion.

Alternatively, also, a display pixel group 292-1 for the second view point of the single screen image 200 which is obtained by synthesizing the first view point image to the seventh view point image illustrated in FIG. 26 with each other may be generated on the basis of a virtual display pixel group 192-2 of the second view point image 102 illustrated in FIG. 25.

In this case, for example, the virtual display pixel group 192-2 composed of a part of the display pixel in the first row and the first from the left of the image 102 of FIG. 25 and a part of the display pixel in the first row and the second from the left as well as a part of the display pixel in the second row and the first from the left and a part of the display pixel in the second row and the second from the left is generated.

It should be noted however that the G sub pixel in the first row of a virtual display pixel group 192-1 is composed of a half of the G sub pixel in the first row of the display pixel in the first from the left and a half of the G sub pixel in the first row of the display pixel in the second from the left. Also, the G sub pixel in the second row of the virtual display pixel group 192-1 is composed of a half of the G sub pixel in the second row of the display pixel in the first from the left and a half of the G sub pixel in the second row of the display pixel in the second from the left.

In the case of FIG. 25 and FIG. 26, for example, a sub pixel obtained as an average value of a value of the G sub pixel in the first row of the display pixel in the first from the left and a value of the G sub pixel in the first row of the display pixel in the second from the left of the image 102 of the virtual display pixel group 192-1 is regarded as the G sub pixel in the first row of the display pixel group before the conversion. Also, a sub pixel obtained as an average value of a value of the G sub pixel in the second row of the display pixel in the first from the left and a value of the G sub pixel in the second row of the display pixel in the second from the left of the image 102 of the virtual display pixel group 192-1 is regarded as the G sub pixel in the second row of the display pixel group before the conversion.

Also, with regard to the G sub pixels in the first row and the second row of the virtual display pixel group 192-1, respectively, among the two sub pixel values, the sub pixel obtained as the higher value may be regarded as the G sub pixel of the display pixel before the conversion, and the sub pixel obtained as the lower value may be regarded as the G sub pixel of the display pixel before the conversion.

In the above-mentioned manner, the values of the respective sub pixels of the virtual display pixel group 192-1 may be identified, and similarly as in the case described above with reference to FIG. 22 and FIG. 23, values of the eight sub pixels included in the display pixel group 292-1 of FIG. 26 may be obtained.

With the above-mentioned setting, the image composed of the pixels in the stripe array can be converted into the image composed of the pixels in the square array at an even higher accuracy.

In the above, the examples of the cases of the straight barrier system and the step barrier system have been described, but the present technology can also be applied to a diagonal barrier system in which an optical aperture of the parallax barrier extends in a diagonal direction.

Figure 27:
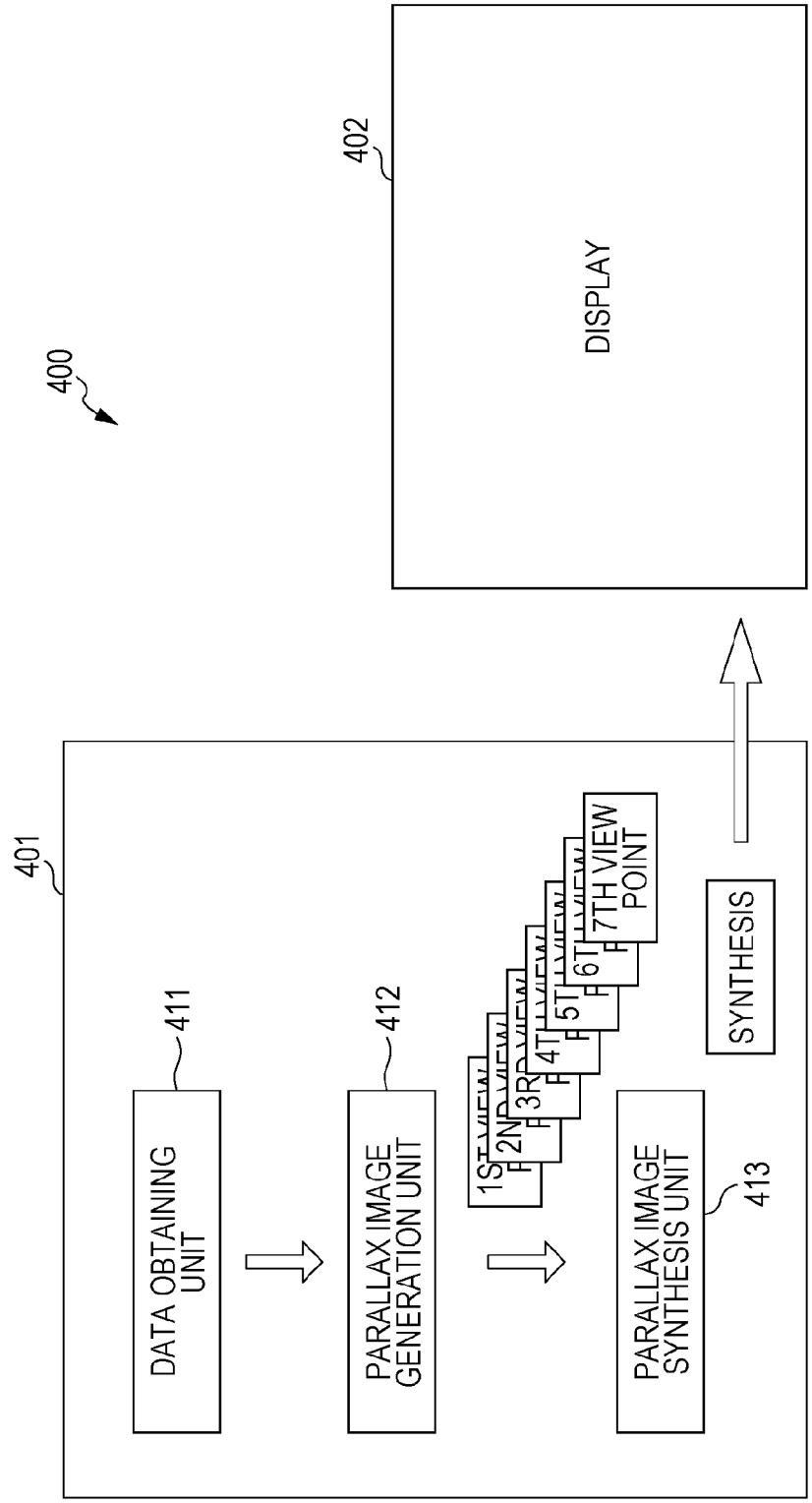
FIG. 27 is a block diagram of a configuration example of a multi-view point three-dimensional display system according to an embodiment to which the present technology is applied.

FIG. 27 is a block diagram of a configuration example of a multi-view point three-dimensional display system according to an embodiment to which the present technology is applied. In the example of FIG. 27, an image processing apparatus 401 and a display 402 constitute a multi-view point three-dimensional display system 400.

As described above with reference to FIG. 4 to FIG. 26, for example, the image processing apparatus 401 synthesizes the images for the multiple view points with each other to generate the single screen image. Also, at this time, the image composed of the pixels in the stripe array is converted into the image composed of the pixels in the square array.

The display 402 is a display that can conduct a three-dimensional display and has the configuration of including the parallax barrier that spatially respectively separates the images for the respective view points between the configuration the screen W and the observers H, for example, as described above with reference to FIG. 1. For example, a slit, a lenticular lens, a liquid crystal lens, or the like is used for the parallax barrier.

Also, the parallax barrier may adopt any of the straight barrier system, the step barrier system, and the diagonal barrier system.

The image processing apparatus 401 of FIG. 27 is constituted by a data obtaining unit 411, a parallax image generation unit 412, and a parallax image synthesis unit 413.

The data obtaining unit 411 obtains image data used, for example, for generating the multi-view point image. The data obtaining unit 411 may be configured, for example, to obtain data recorded in a recording medium or obtain data from another device via a network.

The parallax image generation unit 412 generates image data for plural view points on the basis of the image data obtained by the data obtaining unit 411. The parallax image generation unit 412 generates image data on the first view point image 101 to the seventh view point image 107, for example, which are illustrated in FIG. 7, FIG. 9, FIG. 11, FIG. 13, FIG. 15, FIG. 17, and FIG. 19.

The parallax image synthesis unit 413 synthesizes the images for the multiple view points with each other to generate a single screen image. The parallax image synthesis unit 413 synthesizes the images 200, for example, which are illustrated in FIG. 8, FIG. 10, FIG. 12, FIG. 14, FIG. 16, FIG. 18, and FIG. 20 as the single screen image.

Figure 28:
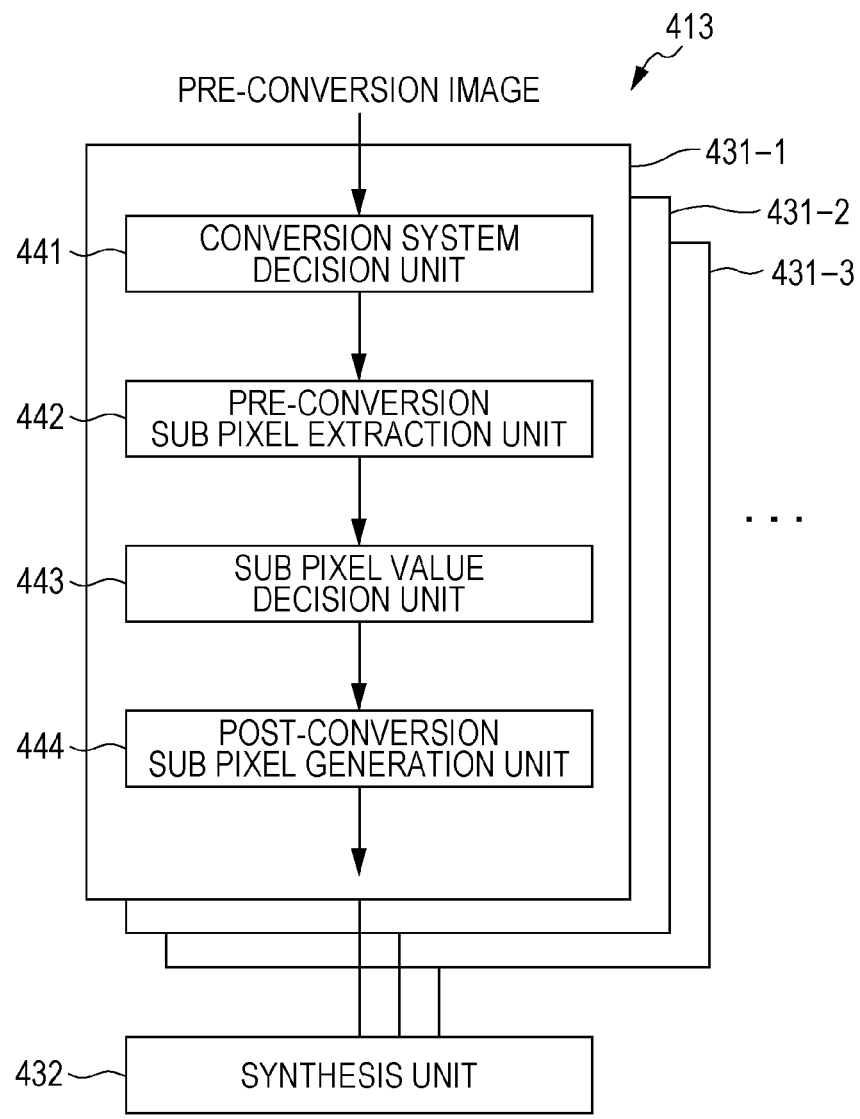
FIG. 28 is a block diagram of a detailed configuration example of a parallax image synthesis unit of FIG. 27.

FIG. 28 is a block diagram of a detailed configuration example of the parallax image synthesis unit 413 of FIG. 27. As illustrated in FIG. 28, the parallax image synthesis unit 413 has a configuration including a pixel conversion unit 431-1, a pixel conversion unit 431-2, a pixel conversion unit 431-3, . . . , and a synthesis unit 432. It should be noted that the number of the pixel conversion units to be provided corresponds to the number of view points of the image data generated in the parallax image generation unit 412. For example, in the parallax image generation unit 412, in a case where image data on the first view point image to an N-th view point image is generated, the pixel conversion unit 431-1, the pixel conversion unit 431-2, the pixel conversion unit 431-3, . . . , and a pixel conversion unit 431-N are provided.

Each of the pixel conversion unit 431-1, the pixel conversion unit 431-2, the pixel conversion unit 431-3, . . . , and the pixel conversion unit 431-N has a similar configuration, and FIG. 28 illustrates a detailed configuration of the pixel conversion unit 431-1. In this example, the pixel conversion unit 431-1 has a configuration including a conversion system decision unit 441, a pre-conversion sub pixel extraction unit 442, a sub pixel value decision unit 443, and a post-conversion sub pixel generation unit 444.

It should be noted that in a case where the pixel conversion unit 431-1, the pixel conversion unit 431-2, the pixel conversion unit 431-3, . . . , the pixel conversion unit 431-N are not distinguished from each other, those pixel conversion units are collectively referred to as pixel conversion unit 431.

The conversion system decision unit 441 identifies, for example, the shape of the parallax barrier (the straight barrier system, the step barrier system, the diagonal barrier system, or the like) of the display 402. Also, the conversion system decision unit 441 identifies a correspondence relationship between the pixels before and after the conversion. For example, it is identified whether the pixels before the conversion are associated with the pixels after the conversion in the manner described above with reference to FIG. 7 to FIG. 20, whether the pixels before the conversion are associated with the pixels after the conversion in the manner described above with reference to FIG. 21, whether the pixels before the conversion are associated with the pixels after the conversion in the manner described above with reference to FIG. 22 and FIG. 23, or whether the pixels before the conversion are associated with the pixels after the conversion in the manner described above with reference to FIG. 24. Alternatively, also, it is identified whether the pixels before the conversion are associated with the pixels after the conversion in the manner described above with reference to FIG. 25 and FIG. 26.

The pre-conversion sub pixel extraction unit 442 extracts sub pixels corresponding to the pixel to be converted after this from the image before the conversion on the basis of the shape of the parallax barrier identified by the conversion system decision unit 441 and the correspondence relationship between the pixels before and after the conversion.

The sub pixel value decision unit 443 decides a pre-conversion sub pixel values.

For example, in a case where the pre-conversion sub pixel extraction unit 442 extracts the display pixel 111-1 of FIG. 7, the sub pixel value decision unit 443 respectively decides the value of the R sub pixel, the value of the G sub pixel, and the value of the B sub pixel that constitute the display pixel 111-1 as values of the sub pixels before the conversion.

Also, for example, in a case where the pre-conversion sub pixel extraction unit 442 extracts the virtual display pixel 112-1 of FIG. 7, first, the sub pixel value decision unit 443 respectively decides the value of the B sub pixel of the display pixel in the fourth from the left of the image 101 and the value of the R sub pixel of the display pixel in the fifth from the left as the values of the sub pixels before the conversion. Furthermore, the sub pixel value decision unit 443 decides an average value of the value of the G sub pixel of the display pixel in the fourth from the left of the image 101 and the value of the G sub pixel of the display pixel in the fifth from the left as the value of the sub pixel before the conversion. It should be noted that among the value of the G sub pixel of the display pixel in the fourth from the left and the value of the G sub pixel of the display pixel in the fifth from the left, the higher value (or the lower value) may be decided as the value of the sub pixel before the conversion.

Furthermore, for example, in a case where the pre-conversion sub pixel extraction unit 442 extracts the sub pixels in the frame 191 illustrated in FIG. 24, first, the sub pixel value decision unit 443 decides the value of the R sub pixel on the upper left edge in the drawing (in the first row and the first column) and the value of the B sub pixel in the second row and the first column as the values of the sub pixels before the conversion. Then, the sub pixel value decision unit 443 decides a value obtained by averaging the value of the sub pixel in the first row and the second column and the value of the sub pixel in the second row and the second column as a value of the sub pixel before the conversion. It should be noted that with regard to the G sub pixel, among the two sub pixel values, the value of the sub pixel obtained as the high value (or the low value) may be decided as the value of the sub pixel before the conversion.

On the basis of the value of the sub pixel before the conversion which is decided by the sub pixel value decision unit 443, the post-conversion sub pixel generation unit 444 computes the value of the sub pixel after the conversion and generate the respective display pixels of the image after the conversion.

In the above-mentioned manner, the pixel conversion unit 431-1 generates the image synthesized only by using the display pixels of the first view point image.

For example, in a case where the image data on the first view point image to the N-th view point image is generated in the parallax image generation unit 412, the configuration is as follows. The pixel conversion unit 431-1 generates the image synthesized only by using the display pixels of the first view point image (for example, the image 200 illustrated in FIG. 8). Similarly, the pixel conversion unit 431-2 generates the image synthesized only by using the display pixels of the second view point image (for example, the image 200 illustrated in FIG. 10), . . . , and a pixel conversion unit 431-7 generates the image synthesized only by using the display pixels of the seventh view point image (for example, the image 200 illustrated in FIG. 20).

Subsequently, the synthesis unit 432 synthesizes the respective images output from the pixel conversion unit 431-1, the pixel conversion unit 431-2, the pixel conversion unit 431-3, . . . to be generate the single screen image.

Figure 29:
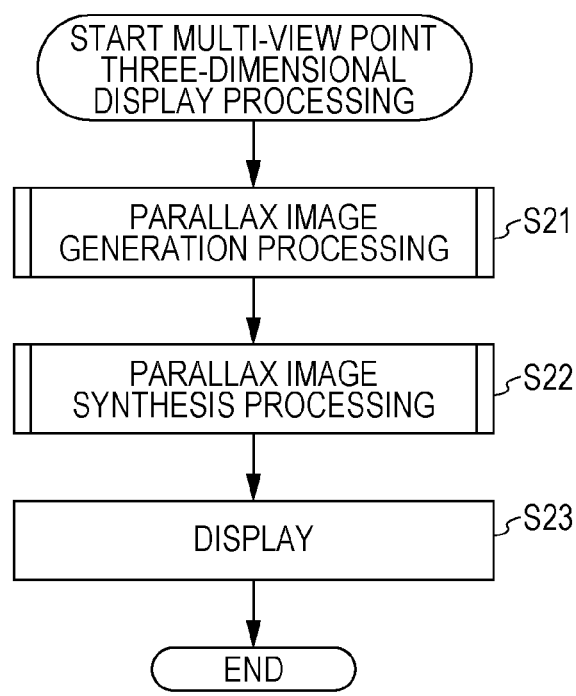
FIG. 29 is a flow chart for describing an example of a multi-view point three-dimensional display processing.

Next, with reference to a flow chart of FIG. 29, a description will be given of an example of a multi-view point three-dimensional display processing by the multi-view point three-dimensional display system 400 of FIG. 27.

In step S21, the parallax image generation unit 412 of the image processing apparatus 401 executes the parallax image generation processing.

Figure 30:
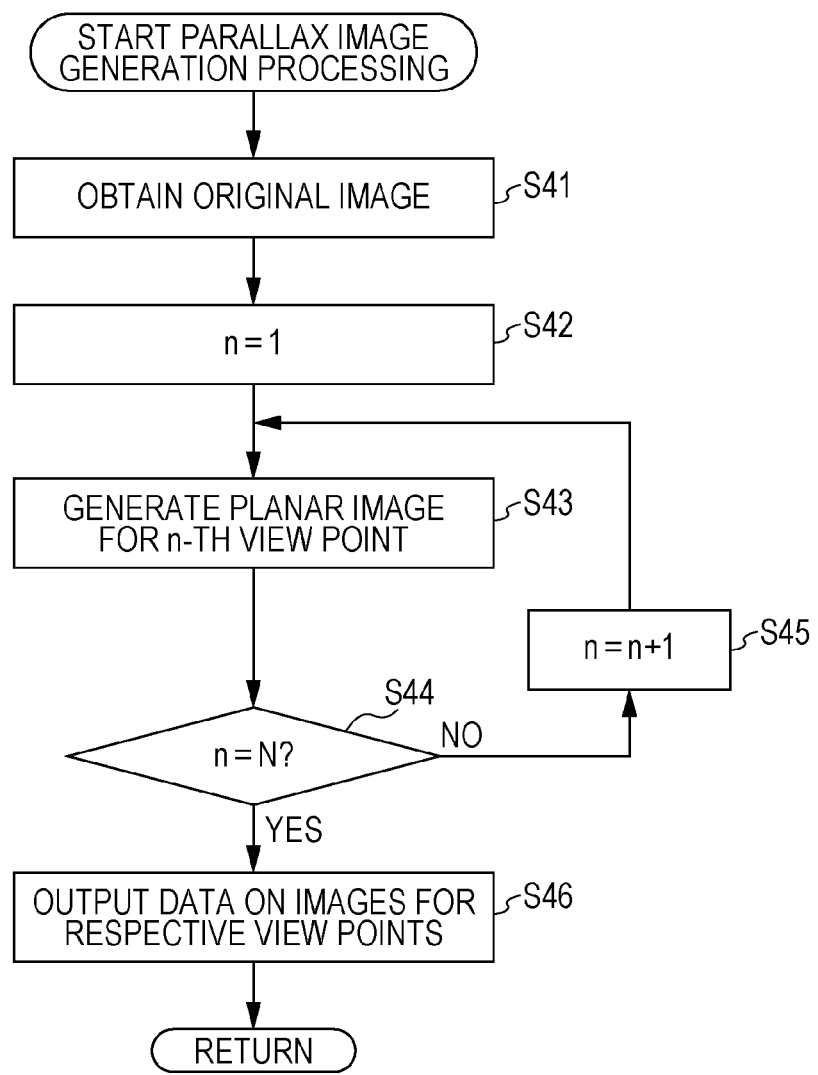
FIG. 30 is a flow chart for describing an example of a parallax image generation processing.

Herein, with reference to a flow chart of FIG. 30, a description will be given of a detailed example of the parallax image generation processing in step S21 of FIG. 29.

In step S41, the parallax image generation unit 412 obtains the original image. At this time, for example, image data used for generating the multi-view point image is obtained via the data obtaining unit 411.

In step S42, a value of a variable n for identifying the view point of the image is set as 1.

In step S43, the parallax image generation unit 412 generates a planar image for the n-th view point on the basis of the image obtained through the processing in step S41.

In step S44, it is determined whether or not the variable n is equal to a number N of the view points of the image to be generated. In a case where it is determined that the value of the variable n is not equal to N, the processing progresses to step S45, and the value of the variable n increments by 1. After that, the processing returns to step S43, and the subsequent processing is repeatedly executed.

In step S44, in a case where it is determined that the variable n is equal to the number N of the view points of the image to be generated, the processing progresses to step S46.

In step S46, the parallax image generation unit 412 outputs the image data for the respective view points. According to this, the image data on the first view point image to the N-th view point image is output. For example, the image data on the first view point image 101 to the seventh view point image 107 which are illustrated in FIG. 7, FIG. 9, FIG. 11, FIG. 13, FIG. 15, FIG. 17, and FIG. 19 is generated to be output.

In the above-mentioned manner, the parallax image generation processing is executed.

While returning to FIG. 29, after the processing in step S21, the processing progresses to step S22.

In step S22, the parallax image synthesis unit 413 of the image processing apparatus 401 executes a parallax image synthesis processing.

Figure 31:
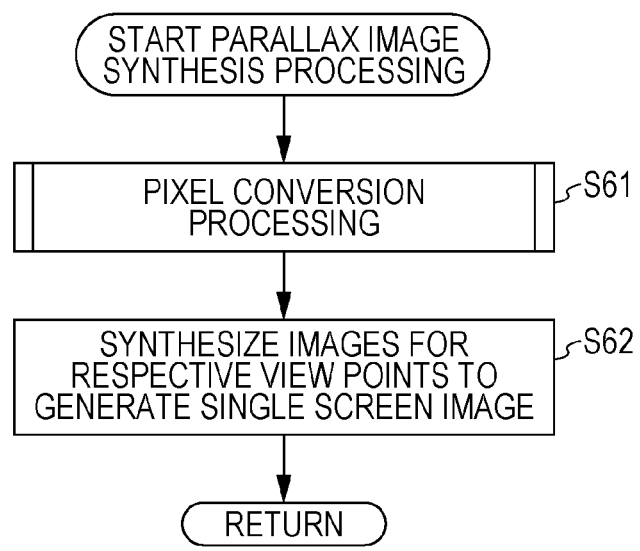
FIG. 31 is a flow chart for describing the example of the parallax image generation processing.

Herein, with reference to a flow chart of FIG. 31, a description will be given of a detailed example of the parallax image synthesis processing in step S22 of FIG. 29.

Figure 32:
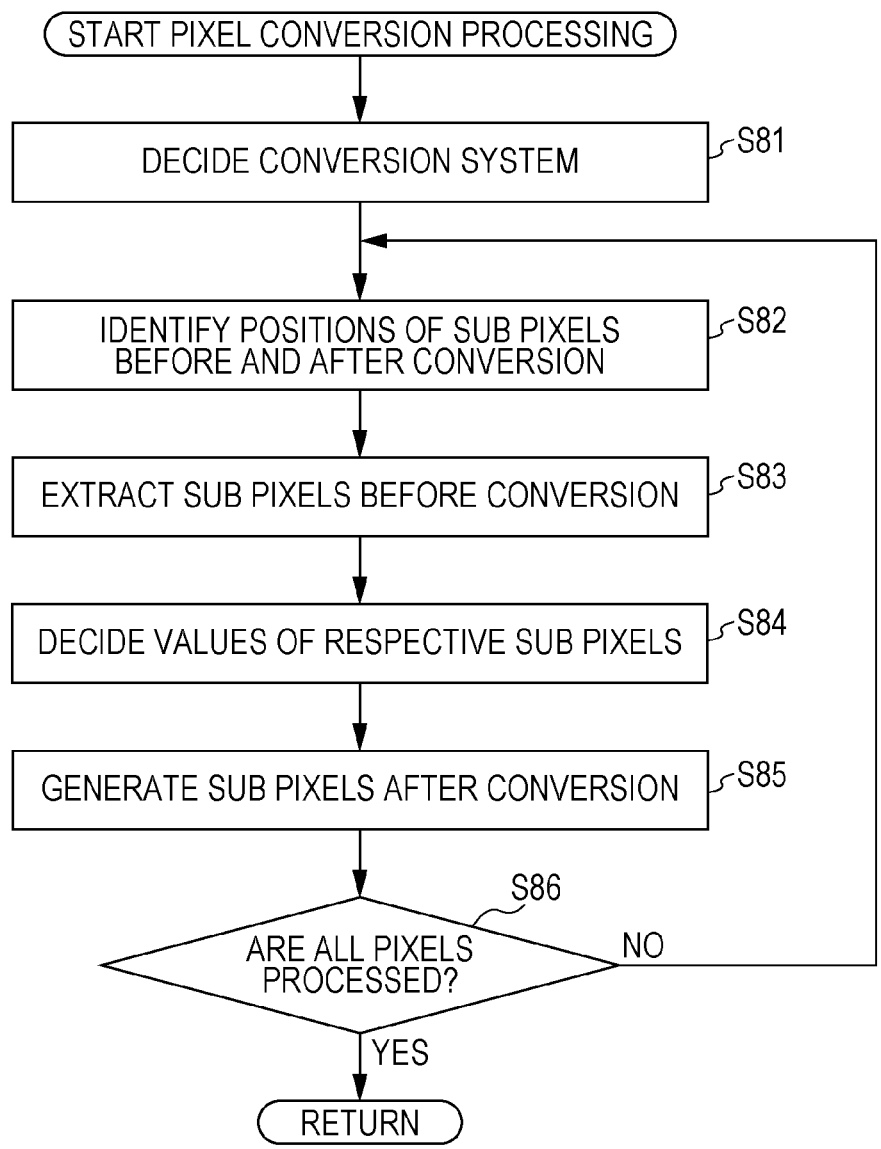
FIG. 32 is a flow chart for describing an example of a pixel conversion processing.

In step S61, the pixel conversion unit 431-1, the pixel conversion unit 431-2, . . . , and the pixel conversion unit 431-N of the parallax image synthesis unit 413 refers to FIG. 32 and a pixel conversion processing which will be described below. According to this, for example, the images 200 illustrated in FIG. 8, FIG. 10, FIG. 12, FIG. 14, FIG. 16, FIG. 18, and FIG. 20 are respectively generated.

In step S62, the synthesis unit 432 of the parallax image synthesis unit 413 synthesizes the images for the respective view points generated in the processing in step S62 with each other to generate a single screen image.

In the above-mentioned manner, the parallax image synthesis processing is executed.

While returning to FIG. 29, after the processing in step S22, the processing advances to step S23. In step S23, the image generated in the processing in step S22 is displayed on the display 402. According to this, the three-dimensional image is presented to the observers.

In the above-mentioned manner, the multi-view point three-dimensional display processing is executed.

Next, with reference to a flow chart of FIG. 32, a description will be given of a detailed example of the pixel conversion processing in step S61 of FIG. 31. This processing is executed, for example, in parallel by each of the pixel conversion unit 431-1, ..., and the pixel conversion unit 431-N. That is, the processings corresponding to the first view point image, ..., and the N-th view point image are respectively executed by the pixel conversion unit 431-1, ..., and the pixel conversion unit 431-N.

In step S81, the conversion system decision unit 441 of the pixel conversion unit 431 decides the conversion system. At this time, the conversion system decision unit 441 identifies, for example, the shape of the parallax barrier (the straight barrier system, the step barrier system, the diagonal barrier system, or the like) of the display 402. Also, the conversion system decision unit 441 identifies a correspondence relationship between the pixels before and after the conversion. For example, it is identified whether the pixels before the conversion are associated with the pixels after the conversion in the manner described above with reference to FIG. 7 to FIG. 20, whether the pixels before the conversion are associated with the pixels after the conversion in the manner described above with reference to FIG. 21, whether the pixels before the conversion are associated with the pixels after the conversion in the manner described above with reference to FIG. 22 and FIG. 23, or whether the pixels before the conversion are associated with the pixels after the conversion in the manner described above with reference to FIG. 24. Alternatively, also, it is identified whether the pixels before the conversion are associated with the pixels after the conversion in the manner described above with reference to FIG. 25 and FIG. 26.

In step S82, on the basis of the correspondence relationship of the pixels before and after the conversion identified along with the processing in step S81, positions of the sub pixels before and after the conversion are identified.

In step S83, the pre-conversion sub pixel extraction unit 442 of the pixel conversion unit 431 extracts sub pixels (sub pixels before the conversion) at the locations identified as a result of the processing in step S82 corresponding to the pixel to be converted after this from the image before the conversion.

In step S84, The sub pixel value decision unit 443 decides pre-conversion sub pixel values.

At this time, for example, in a case where the pre-conversion sub pixel extraction unit 442 extracts the display pixel 111-1 of FIG. 7, the sub pixel value decision unit 443 respectively decides the value of the R sub pixel, the value of the G sub pixel, and the value of the B sub pixel that constitute the display pixel 111-1 as values of the sub pixels before the conversion.

Also, for example, in a case where the pre-conversion sub pixel extraction unit 442 extracts the virtual display pixel 112-1 of FIG. 7, first, the sub pixel value decision unit 443 respectively decides the value of the B sub pixel of the display pixel in the fourth from the left of the image 101 and the value of the B sub pixel of the display pixel in the fifth from the left as the values of the sub pixels before the conversion. Furthermore, the sub pixel value decision unit 443 decides an average value of the value of the G sub pixel of the display pixel in the fourth from the left of the image 101 and the value of the G sub pixel of the display pixel in the fifth from the left as the value of the sub pixel before the conversion. It should be noted that among the value of the G sub pixel of the display pixel in the fourth from the left and the value of the G sub pixel of the display pixel in the fifth from the left, the higher value (or the lower value) may be decided as the value of the sub pixel before the conversion.

Furthermore, for example, in a case where the pre-conversion sub pixel extraction unit 442 extracts the sub pixels in the frame 191 illustrated in FIG. 24, first, the sub pixel value decision unit 443 decides the value of the R sub pixel on the upper left edge in the drawing (in the first row and the first column) and the value of the B sub pixel in the second row and the first column as the values of the sub pixels before the conversion. Then, the sub pixel value decision unit 443 decides a value obtained by averaging the value of the sub pixel in the first row and the second column and the value of the sub pixel in the second row and the second column as a value of the sub pixel before the conversion. It should be noted that with regard to the G sub pixel, among the two sub pixel values, the value of the sub pixel obtained as the high value (or the low value) may be decided as the value of the sub pixel before the conversion.

In step S85, on the basis of the value of the sub pixel before the conversion which is decided by the sub pixel value decision unit 443 through the processing in step S84, the post-conversion sub pixel generation unit 444 computes the value of the sub pixel after the conversion and generate the respective display pixels of the image after the conversion.

In step S86, it is determined whether or not the processing is carried out for all the pixels with regard to the image for the relevant view point. In a case where it is determined that the processing is not yet carried out for all the pixels, the processing returns to step S82, and the subsequent processing is repeatedly executed.

In step S86, in a case where it is determined that the processing is carried out for all the pixels with regard to the image for the relevant view point, the processing ends.

In the above-mentioned manner, the pixel conversion processing is executed.

FIG. 33 is a block diagram of another configuration example of the multi-view point three-dimensional display system according to the embodiment to which the present technology is applied. Although the image processing apparatus 401 and the display 402 constitute the multi-view point three-dimensional display system 400, in the case of the example of FIG. 33, the image processing apparatus 401 is constituted by the parallax image generation unit 412 and the parallax image synthesis unit 413. In this manner, for example, without providing the data obtaining unit 411, the parallax image generation unit may be configured to individually generate the images for the respective view points.

FIG. 34 is a block diagram of still another configuration example of the multi-view point three-dimensional display system according to the embodiment to which the present technology is applied. Although the image processing apparatus 401 and the display 402 constitute the multi-view point three-dimensional display system 400, in the case of the example of FIG. 34, the image processing apparatus 401 is constituted by the data obtaining unit 411 and the parallax image synthesis unit 413. In this manner, for example, the data obtaining unit 411 may be configured to directly obtain the images for the respective view points.

It should be noted that the above-mentioned series of processings can be executed by hardware or can also be executed by software. In a case where the series of processings is executed by the software, programs constituting the software are installed via a network or a recording medium to a computer incorporated in dedicated-use hardware, a general-use personal computer 700 capable of executing various functions by installing various programs, for example, which is illustrated in FIG. 35, or the like.

In FIG. 35, a CPU (Central Processing Unit) 701 executes various processings in accordance with programs stored in a ROM (Read Only Memory) 702 or programs loaded into a RAM (Random Access Memory) 703 from a storage unit 708. The RAM 703 also appropriately stores data used for the CPU 701 to execute the various processings.

The CPU 701, the ROM 702, and the RAM 703 are mutually connected via a bus 704. An input and output interface 705 is also connected to the bus 704.

An input unit 706 composed of a key board, a mouse, or the like, an output unit 707 composed of a display such as an LCD (Liquid Crystal display) as well as a speaker or the like, the storage unit 708 composed of a hard disk, and a communication unit 709 composed of a modem, a network interface card such as a LAN card, or the like are connected to the input and output interface 705. The communication unit 709 performs a communication processing via a network including the internet.

A drive 710 is also connected to the input and output interface 705 as appropriate. A removable medium 711 such as a magnetic disk, an optical disk, an opto-magnetic disk, or a semiconductor memory is appropriately mounted to the drive 710, and computer programs read from the removable medium are installed into the storage unit 708 as appropriate.

In a case where the above-mentioned series of processings is executed by the software, the programs constituting the software are installed from the network such as the internet or the recording medium composed of the removable medium 711 or the like.

It should be noted that this recording medium includes, other than an apparatus main body illustrated in FIG. 35, a medium constituted by the removable medium 711 composed of which is circuited for distributing the programs to a user and is composed of a magnetic disk (including a floppy disk (registered trademark)), an optical disk (CD-ROM (Compact Disk-Read Only Memory), a DVD (including Digital Versatile Disk)), an opto-magnetic disk (including MD (Mini-Disk) (registered trademark)), a semiconductor memory, or the like on which the programs are recorded as well as a medium constituted by the ROM 702, the hard disk included in the storage unit 708, or the like on which the programs are recorded which is circulated to the user while previously being incorporated in the apparatus main body.

It should be noted that the above-mentioned series of processings in the present specification of course includes processings executed in a time series manner in the stated order but also processings executed in a parallel manner or individually while not being processed in the time series manner.

Also, embodiments of the present technology are not limited to the above-mentioned embodiments, and various modifications can be made without departing from the gist of the present technology.

It should be noted that the present technology can also adopt the following configurations.

(1) A display control apparatus including: a conversion and synthesis unit configured to convert an array of pixels constituting each of planar images for multiple view points and synthesize the planar images for the multiple view points with each other in which the array of the pixels is converted to generate a three-dimensional display image, the conversion and synthesis unit including a correspondence control unit configured to associate view point image sub pixels corresponding to sub pixels of the pixel constituting each of the planar images for the multiple view points with three-dimensional display sub pixels corresponding to sub pixels of the pixels constituting the three-dimensional display image, a sub pixel value decision unit configured to decide a value of the sub pixel before the conversion for each color of the sub pixels on the basis of the view point image sub pixel extracted from the planar image for each view point, and a sub pixel generation unit configured to obtain a value of the sub pixel after the conversion on the basis of the decided value of the sub pixel before the conversion to generate the three-dimensional display sub pixels associated with the view point image sub pixels.

(2) The display control apparatus according to (1), in which the conversion and synthesis unit converts pixels in a stripe array composed of sub pixels of three colors into pixels in a square array composed of sub pixels of four colors.

(3) The display control apparatus according to (1) or (2), in which a resolution in a horizontal direction is set to be doubled and a resolution in a vertical direction is set to be halved in the three-dimensional display image with respect to the planar image.

(4) The display control apparatus according to any one of (1) to (3), in which the sub pixel value decision unit decides, in a case where two or more sub pixels are included per color in the view point image sub pixels associated by the correspondence control unit, a value obtained by applying a predetermined computation on values of the two or more sub pixels as the value of the sub pixel before the conversion related to the relevant color.

(5) The display control apparatus according to any one of (1) to (4), in which the sub pixel value decision unit decides, in a case where two sub pixels are included per color in the view point image sub pixels associated by the correspondence control unit, a higher value among the two sub pixel values as the value of the sub pixel before the conversion related to the relevant color.

(6) The display control apparatus according to any one of (1) to (5), in which the sub pixel value decision unit decides, in a case where two sub pixels are included per color in the view point image sub pixels associated by the correspondence control unit, a lower value among the two sub pixel values as the value of the sub pixel before the conversion related to the relevant color.

(7) The display control apparatus according to any one of (1) to (6), in which a three-dimensional image is observed by observing the three-dimensional display image synthesized by the conversion and synthesis unit through a parallax barrier having a predetermined shape.

(8) A display control method including: generating a three-dimensional display image by a conversion and synthesis unit by converting an array of pixels constituting each of planar images for multiple view points and synthesizing the planar images for the multiple view points in which the array of the pixels is converted with each other, the generating the three-dimensional display image including associating view point image sub pixels corresponding to sub pixels of the pixel constituting each of the planar images for the multiple view points with three-dimensional display sub pixels corresponding to sub pixels of the pixels constituting the three-dimensional display image, deciding a value of the sub pixel before the conversion for each color of the sub pixels on the basis of the view point image sub pixel extracted from the planar image for each view point, and generating the three-dimensional display sub pixels associated with the view point image sub pixels by obtaining a value of the sub pixel after the conversion on the basis of the decided value of the sub pixel before the conversion.

(9) A display apparatus including: a display control unit including a conversion and synthesis unit configured to convert an array of pixels constituting each of planar images for multiple view points and synthesize the planar images for the multiple view points with each other in which the array of the pixels is converted to generate a three-dimensional display image, a display unit configured to display the three-dimensional display image generated by the display control unit, and a separation unit configured to optically separate the images for the respective view points from each other in the displayed three-dimensional display image to cause the images of different view points to be observed by different eyes of an observer, the conversion and synthesis unit including a correspondence control unit configured to associate view point image sub pixels corresponding to sub pixels of the pixel constituting each of the planar images for the multiple view points with three-dimensional display sub pixels corresponding to sub pixels of the pixels constituting the three-dimensional display image, a sub pixel value decision unit configured to decide a value of the sub pixel before the conversion for each color of the sub pixels on the basis of the view point image sub pixel extracted from the planar image for each view point, a sub pixel generation unit configured to obtain a value of the sub pixel after the conversion on the basis of the decided value of the sub pixel before the conversion to generate the three-dimensional display sub pixels associated with the view point image sub pixels.

(10) The display apparatus according to (9), in which a liquid crystal lens is used for an optical separation element constituting the separation unit.

The present disclosure contains subject matter related to that disclosed in Japanese Priority Patent Application JP 2011-255534 filed in the Japan Patent Office on Nov. 22, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus comprising:
a processor; and
a memory, the memory storing program code executable by the processor to perform operations comprising:
a conversion-synthesis to convert an array of pixels constituting each of planar images for multiple view points and synthesize the planar images for the multiple view points with each other in which the array of the pixels is converted to generate a 3D-display image,
the conversion-synthesis comprising:
a correspondence control to associate view-point-image sub pixels corresponding to sub pixels of the pixel constituting each of the planar images for the multiple view points with 3D-display sub pixels corresponding to sub pixels of the pixels constituting the 3D-display image;
a sub pixel value decision to extract the view-point-image sub pixels associated with the 3D-display sub pixels and to decide a value of each sub pixel before the conversion of the array of pixels for each color of the sub pixels on the basis of the view-point-image sub pixel extracted from the planar image for each view point; and
a sub pixel generation to obtain a value of the sub pixel after the conversion on the basis of the decided value of the sub pixel before the conversion to generate the 3D-display sub pixels associated with the view-point-image sub pixels, wherein the sub pixel generation converts display pixels that are based on first pixel arrays constituted of the view-point-image sub pixels to display pixels that are based on second pixel arrays constituted of the 3D-display sub pixels, the second pixel arrays being different from the first display arrays;
wherein, when the display pixels corresponding to the 3D-display sub pixels are specified, the sub pixel generation generates the 3D-display sub pixels of the second display arrays based on calculated values of the view-point-display sub pixels of the first display arrays; and
wherein, when the display pixels corresponding to the 3D-display sub pixels are not specified, the sub pixel generation generates virtual display pixels, the virtual display pixels including parts of first and second display pixels that are adjacent to each other, and one color of the virtual display pixels including sub pixels of the first display pixels and sub pixels of the second display pixels, and
the sub pixel generation generates the 3D-display sub pixels of the second display arrays based on the virtual display pixels as the first display arrays.

2. The display control apparatus according to claim 1, wherein the first pixel arrays are pixels in a stripe array composed of sub pixels of three colors, the second pixel arrays are pixels in a square array composed of sub pixels of four colors, and the conversion-synthesis converts the pixels in the stripe array into the pixels in the square array.

3. The display control apparatus according to claim 1, wherein a resolution in a horizontal direction is set to be doubled and a resolution in a vertical direction is set to be halved in the 3D-display image with respect to the planar image.

4. The display control apparatus according to claim 1, wherein the sub pixel value decision decides, when two or more sub pixels are included per color in the view-point-image sub pixels associated by the correspondence control, a value obtained by applying a predetermined computation on values of the two or more sub pixels as the value of the sub pixel before the conversion related to the relevant color.

5. The display control apparatus according to claim 1, wherein the sub pixel value decision decides, when two sub pixels are included per color in the view-point-image sub pixels associated by the correspondence control, a higher value among the two sub pixel values as the value of the sub pixel before the conversion related to the relevant color.

6. The display control apparatus according to claim 1, wherein the sub pixel value decision decides, when two sub pixels are included per color in the view-point-image sub pixels associated by the correspondence control, a lower value among the two sub pixel values as the value of the sub pixel before the conversion related to the relevant color.

7. The display control apparatus according to claim 1, wherein a 3D-image is observed by observing the 3D-display image synthesized by the conversion-synthesis through a parallax barrier having a predetermined shape.

8. A display control method comprising:
generating a 3D-display image by a conversion-synthesis by converting an array of pixels constituting each of planar images for multiple view points and synthesizing the planar images for the multiple view points in which the array of the pixels is converted with each other, the generating of the 3D-display image including:
associating view-point-image sub pixels corresponding to sub pixels of the pixel constituting each of the planar images for the multiple view points with 3D-display sub pixels corresponding to sub pixels of the pixels constituting the 3D-display image,
extracting the view-point-image sub pixels associated with the 3D-display sub pixels,
deciding a value of each sub pixel before the conversion of the array of pixels for each color of the sub pixels on the basis of the view-point-image sub pixel extracted from the planar image for each view point, and
generating the 3D-display sub pixels associated with the view-point-image sub pixels by obtaining a value of the sub pixel after the conversion on the basis of the decided value of the sub pixel before the conversion,
wherein the generating of the 3D-display sub pixels converts display pixels that are based on first pixel arrays constituted of the view-point-image sub pixels to display pixels that are based on second pixel arrays constituted of the 3D-display sub pixels, the second pixel arrays being different from the first display arrays;
wherein, when the display pixels corresponding to the 3D-display sub pixels are specified, the generating of the 3D-display sub pixels generates the 3D-display sub pixels of the second display arrays based on calculated values of the view-point-display sub pixels of the first display arrays; and
wherein, when the display pixels corresponding to the 3D-display sub pixels are not specified, the generating of the 3D-display sub pixels generates virtual display pixels, the virtual display pixels including parts of first and second display pixels that are adjacent to each other, and one color of the virtual display pixels including sub pixels of the first display pixels and sub pixels of the second display pixels, and
the generating of the 3D-display sub pixels generates the 3D-display sub pixels of the second display arrays based on the virtual display pixels as the first display arrays.

9. A display apparatus comprising:
display control circuitry configured to provide conversion-synthesis to convert an array of pixels constituting each of planar images for multiple view points and synthesize the planar images for the multiple view points with each other in which the array of the pixels is converted to generate a 3D-display image;
a display unit configured to display the 3D-display image generated by the display control circuitry; and
a separation unit configured to optically separate the images for the respective view points from each other in the displayed 3D-display image to cause the images of different view points to be observed by different eyes of an observer,
the conversion-synthesis including:
a correspondence control to associate view-point-image sub pixels corresponding to sub pixels of the pixel constituting each of the planar images for the multiple view points with 3D-display sub pixels corresponding to sub pixels of the pixels constituting the 3D-display image,
a sub pixel value decision to extract the view-point-image sub pixels associated with the 3D-display sub pixels and to decide a value of each sub pixel before the conversion of the array of pixels for each color of the sub pixels on the basis of the view-point-image sub pixel extracted from the planar image for each view point, and
a sub pixel generation to obtain a value of the sub pixel after the conversion on the basis of the decided value of the sub pixel before the conversion to generate the 3D-display sub pixels associated with the view-point-image sub pixels,
wherein the sub pixel generation converts display pixels that are based on first pixel arrays constituted of the view-point-image sub pixels to display pixels that are based on second pixel arrays constituted of the 3D-display sub pixels, the second pixel arrays being different from the first display arrays;
wherein, when the display pixels corresponding to the 3D-display sub pixels are specified, the sub pixel generation generates the 3D-display sub pixels of the second display arrays based on calculated values of the view-point-display sub pixels of the first display arrays; and
wherein, when the display pixels corresponding to the 3D-display sub pixels are not specified, the sub pixel generation generates virtual display pixels, the virtual display pixels including parts of first and second display pixels that are adjacent to each other, and one color of the virtual display pixels including sub pixels of the first display pixels and sub pixels of the second display pixels, and
the sub pixel generation generates the 3D-display sub pixels of the second display arrays based on the virtual display pixels as the first display arrays.

10. The display apparatus according to claim 9,
wherein a liquid crystal lens is used for an optical separation element constituting the separation unit.

* * * * *